US011893772B1

(12) United States Patent
Gokalp et al.

(10) Patent No.: US 11,893,772 B1
(45) Date of Patent: Feb. 6, 2024

(54) ARTIFICIAL INTELLIGENCE SYSTEM WITH ITERATIVE TWO-PHASE ACTIVE LEARNING

(71) Applicant: Amazon Technologies, Inc., Seattle, WA (US)

(72) Inventors: Sedat Gokalp, Kirkland, WA (US); Tarun Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 684 days.

(21) Appl. No.: 16/706,472

(22) Filed: Dec. 6, 2019

(51) Int. Cl.
*G06F 17/18* (2006.01)
*G06V 10/75* (2022.01)
*G06N 20/00* (2019.01)
*G06F 18/2113* (2023.01)
*G06F 18/214* (2023.01)
*G06F 18/2411* (2023.01)

(52) U.S. Cl.
CPC ............ *G06V 10/758* (2022.01); *G06F 17/18* (2013.01); *G06F 18/2113* (2023.01); *G06F 18/2155* (2023.01); *G06F 18/2411* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 9,911,033 B1 * | 3/2018 | Harary | G06V 30/19173 |
| 9,911,326 B2 * | 3/2018 | Xu | G08G 1/0112 |
| 10,614,373 B1 * | 4/2020 | Jeffery | G06N 5/04 |
| 10,713,597 B2 * | 7/2020 | Copper | G06N 3/045 |
| 2017/0193402 A1 * | 7/2017 | Grehant | G06N 20/20 |
| 2019/0130110 A1 * | 5/2019 | Lee | G06N 3/08 |
| 2020/0065968 A1 * | 2/2020 | Sargent | G06V 10/82 |
| 2020/0327381 A1 * | 10/2020 | Tan | G06F 40/284 |
| 2020/0349467 A1 * | 11/2020 | Teague | G06F 16/9027 |
| 2020/0372398 A1 * | 11/2020 | Shaikh | G06N 20/10 |
| 2021/0133557 A1 * | 5/2021 | Iyoob | G06N 3/044 |
| 2021/0144012 A1 * | 5/2021 | Ghanea-Hercock | H04L 9/3073 |
| 2021/0192412 A1 * | 6/2021 | Krishnaswamy | G06Q 30/0201 |

OTHER PUBLICATIONS

Michael Bloodgood et al, "A Method for Stopping Active Learning Based on Stabilizing Predictions and the Need for User-Adjustable Stopping", dated Sep. 17, 2014, pp. 1-9.

(Continued)

*Primary Examiner* — William J Jacob
(74) *Attorney, Agent, or Firm* — Robert C. Kowert; Kowert, Hood, Munyon, Rankin & Goetzel, P.C.

(57) ABSTRACT

Learning iterations, individual ones of which include a respective bucket group selection phase and a class boundary refinement phase, are performed using a source data set whose records are divided into buckets. In the bucket group selection phase of an iteration, a bucket is selected for annotation based on output obtained from a classification model trained in the class boundary refinement phase of an earlier iteration. In the class boundary refinement phase, records of buckets annotated as positive-match buckets for a target class in the bucket group selection phase are selected for inclusion in a training set for a new version of the model using a model enhancement criterion. The trained version of the model is stored.

20 Claims, 11 Drawing Sheets

(56) References Cited

OTHER PUBLICATIONS

Andrew I. Schein et al, "Active Learning for Logistic Regression: An Evaluation", dated Aug. 4, 2007, pp. 1-31.
Garrett Beatty et al, "The Use of Unlabeled Data Versus Labeled Data for Stopping Active Learning for Text Classification", dated Apr. 22, 2019, pp. 1-8.
Florian Laws et al, "Stopping Criteria for Active Learning of Named Entity Recognition", dated Aug. 2008, pp. 465-472.
Yoav Freund, "Selective Sampling Using the Query by Committee Algorithm", dated 1997, pp. 133-168.
H.S. Seung et al, "Query by Committee", pp. 1-8.
Alina Beygelzimer et al, "Search Improves Label for Active Learning", dated 2016, 30th Conference on Neural Information Processing Systems, pp. 1-9.
Josh Attenberg et al, "Why Label when you can Search? Alternatives to Active Learning for Applying Human Resources to Build Classification Models Under Extreme Class Imbalance", dated Jul. 25-28, 2010, pp. 1-10.
Burr Settles et al, "Multiple-Instance Active Learning", pp. 1-8.
Greg Schohn et al, "Less is More: Active Learning with Support Vector Machines", dated 2000, pp. 1-8.
Wen-tau Yih et al, "Learning at Low False Positive Rates", dated Jul. 27-28, 2006, pp. 1-8.
Yangzihao Wang, "Large-Scale Live Active Learning: Training Object Detectors with Crawled Data and Crowds", dated Oct. 30, 2014, pp. 1-39.
Jingbo Zhu et al, "Learning a Stopping Criterion for Active Learning for Word Sense Disambiguation and Text Classification" pp. 1-7.
David Cohn et al, "Improving Generalization with Active Learning", dated 1994, pp. 201-221.
Andrew Kachites McCallum et al, "Employing EM and Pool-Based Active Learning for Text Classification", pp. 1-9.
Thomas Trappenberg et al, "Coverage-performance estimation for classification with ambiguous data", dated Apr. 2005, pp. 1-6.
D. Sculley et al, "Detecting Adversarial Advertisements in the Wild", dated Aug. 21-24, 2011, pp. 1-9.
Burr Settles et al, "Computer Sciences Department" dated Jan. 2009, pp. 1-47.
Andreas Vlachos, "A Stopping criterion for active learning", dated Oct. 3, 2007, pp. 1-29.
Josh Attenberg et al, "Class Imbalance and Active Learning", Dated Feb. 26, 2013, pp. 1-51.
Nicholas Roy et al, "Toward Optimal Active learning through sampling Estimation of Error Reduction", pp. 1-8.

\* cited by examiner

Example techniques for initial bucketing 301

- Keyword analysis 305
- Locality-sensitive hashing 311
- Language models 312
- Pre-existing semantics or hierarchies 313
- Randomized bucketing 314

. . .

Example bucket-ranking techniques for phase 1 321

- Annotator-generated search queries 325
- Automatically-generated/recommended search queries 328
- Neighborhood metadata 331
- Class scores/probabilities provided by phase 2 classifier of earlier iteration 334

. . .

Example unlabeled record ranking techniques for phase 2 341

- Query-by-committee 343
- Uncertainty sampling 345
- Expected model change 347
- Expected error/variance reduction 349

ARTIFICIAL INTELLIGENCE SYSTEM WITH ITERATIVE TWO-PHASE ACTIVE LEARNING

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Classification, or the task of identifying to which of a set of categories (sub-populations) a new observation belongs, on the basis of learning from a training set of data containing observations or examples whose category membership is known, is one of the most useful and often-used categories of machine learning techniques. A number of algorithms for classification of different levels of sophistication have been developed over the years, including, for example, linear classifiers such as logistic regression algorithms, Bayesian classifiers, support vector machines, decision-tree based algorithms, neural network-based algorithms and the like.

For many classification problem domains, a very large number of unlabeled observations or examples may be available, and labels may have to be assigned to at least a subset of the examples to generate an appropriate training data set for the particular classification algorithm being used. In order to assign the labels, depending on the complexity of the problem, in some cases subject matter experts may have to be employed. For example, to label some types of medical records to indicate the likely presence or absence of a disease, the assistance of medical professionals may be required. Even in scenarios where the task of distinguishing among classes is less complex, generating sufficient numbers of positive labeled examples for a given class may require substantial effort. Furthermore, some large data sets are highly skewed, in that positive examples of a particular class are extremely rare, making it harder to efficiently identify examples to be used for training a classification model. As a result of these and other factors, generating high quality classification models for large skewed data sets in a timely manner can present a non-trivial technical challenge.

BRIEF DESCRIPTION OF DRAWINGS

FIG. 3 illustrates example alternatives for lower-level methodologies which may be employed at various stages of an iterative two-phase active learning based classification procedure, according to at least some embodiments.

Figure 1:
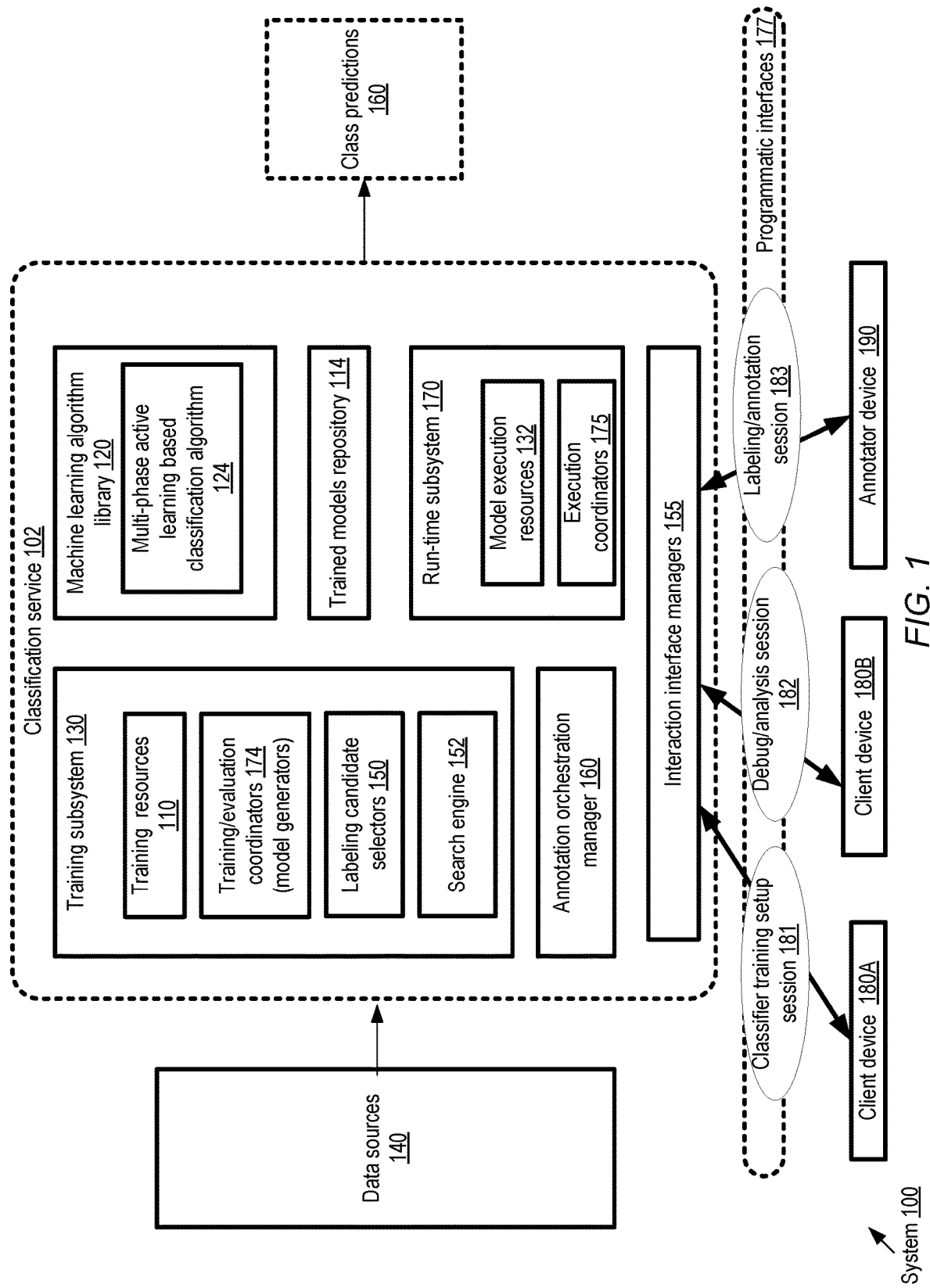
FIG. 1 illustrates an example system environment in which a classification service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficient training of machine learning models such as classifiers using an iterative two-phase active learning based technique. The algorithms and techniques described herein may be especially beneficial in scenarios in which the unlabeled data sets from which examples are to be selected and annotated for training the models are (a) extremely large (e.g., containing millions or billions of records) and (b) skewed (e.g., only a very small fraction of the unlabeled records represent true positive examples of a class of interest or "target" class). As a result of these characteristics, training classification models for such data sets using techniques such as random sampling-based selection of training example candidates, or even using conventional active learning, may be extremely resource intensive and inefficient.

Broadly speaking, the term "active learning" refers to methodologies in which information sources or annotators are queried to obtain respective labels or output variable values for intelligently-selected records of a data set, and then the obtained labels or output variable values are used to train or enhance machine learning models. Depending on how beneficial the selected records turn out to be with respect to representing relevant characteristics of the data for the particular machine learning problem being addressed, the speed with which high quality models can be trained may be improved substantially using active learning. At a high level, the techniques described herein may utilize active learning iteratively at two granularities in various embodiments: a coarse level in the first phase of a given iteration, and a fine level in the second phase of the iteration. The input for the second phase of a given iteration may be determined at least partly by the coarse-grained analysis done in the first phase of that iteration, while exploration-based feedback from the second phase of the iteration may be provided as input for the first phase of the next iteration in at least some embodiments.

In a preliminary or preparatory stage in various embodiments, prior to the initiation of the active learning iterations, the records of the unlabeled data set may be subdivided (e.g., using available metadata such as coarse-grained descriptive keywords for the individual records, or even using random grouping) into record collections which may be called "buckets". Other terms, such as clusters or record collections, may be used for such groups in some embodiments. Individual ones of the buckets may comprise a plurality of records, and the boundaries or memberships of the buckets themselves may remain unchanged during the iterations of active learning in at least some embodiments. In the first or coarse-grained phase of an iteration, which may also be referred to as the bucket group selection phase, some number of buckets may be selected (e.g., using various ranking techniques) as candidates for bucket-level annotation. A small sample of the records of a candidate bucket may be provided to one or more bucket-level annotators in some embodiments, along with a descriptor of at least one target class. If a positive example of a target class is identified in the sample records of a candidate bucket by a bucket-level annotator, that bucket may be labeled as a positive-match bucket with respect to the target class, and included in a group of buckets to be analyzed at a finer granularity in the second phase. As such, the groups of positive-match buckets may form the domain for finer-grained analysis in the second phase of the iteration. The bucket group selection phase may accordingly also be referred to as a domain adjustment phase in some embodiments. In at least some embodiments, the number of positive-match buckets included in the domain may typically grow over time, especially during the early iterations of the algorithm, as more buckets are explored and additional buckets containing true positive examples of a target class are identified. The bucket group selection phase of a given iteration may be terminated based on any of various criteria in different embodiments, including for example when the rate at which new positive-match buckets are being identified falls below a threshold, or if a resource or time limit for the first phase is reached.

In some embodiments, multiple techniques may be used for subdividing the data set into buckets. In one example scenario, if bucketing techniques BT1, BT2 and BT3 are available, the data set may be subdivided into respective bucket collections or sets BBT1, BBT2, and BBT3 using the three available techniques; then, buckets from any of the three bucket sets may be chosen as candidates for labeling by the bucket-level annotators. In some embodiments, the bucketing techniques whose resultant bucket sets are used may vary from one iteration of the two-phase active learning to another; in other embodiments, the same bucketing technique may be used in all the iterations. In at least some embodiment, the buckets defined using any given bucketing technique may not necessarily be non-overlapping: e.g., within bucket set BBT3 in the above example, a given record of the data set may potentially belong to multiple buckets.

The second, finer-grained active learning-based phase of the iteration may be referred to as the class boundary refinement phase in at least some embodiments. In the second phase, whose input consists of records of the positive-match buckets identified in the bucket group selection phase, any of a variety of active learning techniques such as query-by-committee or uncertainty sampling may be used to select candidate unlabeled records for annotation from among the members of the positive-match buckets. These labeling-candidate records, selected based on meeting criteria for model enhancement potential (i.e., records which, if labeled, would be expected to enhance the quality of the classification model more than other as-yet-unlabeled records), may then be provided to a set of record-level annotators. Labels with respect to one or more target classes may be obtained for the records from the record-level annotators. A training data set for the current iteration's version of a classification model may then be chosen, and may comprise at least some of the records for which labels were obtained from the record-level annotators. The classification model may then be trained in the class boundary refinement phase. The trained classification model may be tested. If it meets targeted quality criteria (and/or other training termination criteria such as resource consumption-based or time-based completion criteria are met), the current trained version of the model may be used to obtain classification scores with respect to one or more target classes for some number of as-yet-unlabeled records of other buckets (which were not in the domain of positive-match buckets consumed as input for the class boundary refinement phase). The classification scores may be provided as input to the bucket group selection phase of the next two-phase iteration in at least some embodiments, in which the domain may potentially be expanded. After the completion criteria for both phases have been met (e.g., if the quality of the trained classification model of the second phase has reached a desired level as indicated by test results, and the rate at which positive-match buckets are being found in the first phase is below a threshold), the trained classification model may be stored and used to generate class predictions for additional records in various embodiments, at least some of which are not part of the initial unlabeled data set.

As one skilled in the art will appreciate in light of this disclosure, certain embodiments may be capable of achieving various advantages, including some or all of the following: (a) reducing the overall amount of CPU, memory, networking and storage resources that have to be utilized for developing machine learning models of a desired quality level, even in scenarios in which hundreds of millions of unlabeled data items or observations pertaining to a given machine learning problem are available and the distribution of target classes in the data is non-uniform, (b) enhancing the user experience of users interacting with an automated machine learning environment, e.g., by simplifying the presentation of potentially complex combinations of metrics and analysis results which clearly indicate the rate of improvement of the models, and/or (c) reducing the resources needed to generate labels for records to be included in training sets, e.g., by automatically generating search queries that can help identify buckets that are likely to prove superior candidates for annotation, and by performing annotation initially at a coarse-grained level to avoid wasting effort on subsets of the data sets which are unlikely to yield positive examples. Note that the techniques described herein may be applied with equal success to scenarios in which data sets to be used for classifiers are not necessarily skewed (e.g., the distribution of different classes is approximately uniform), and/or not necessarily extremely large.

According to at least some embodiments, a system may comprise one or more computing devices. The computing devices may include instructions that when executed on or across one or more processors cause the devices to obtain an indication of a source data set via one or more programmatic interfaces. In at least some embodiments, the programmatic interfaces may be implemented at a network-accessible machine learning service of a provider network such as a public cloud environment, or a classification service of such a provider network. The source data set may comprise a plurality of records, at least some of which may be unlabeled initially. In at least some embodiments, a respective descriptor of one or more target classes into which the records are to be categorized with the help of one or more machine learning models may also be obtained programmatically. For example, in the case of a financial fraud detection application, descriptors which indicate the kinds of evidence that can be used (e.g., by human or automated annotators) to classify a given transaction represented by a record of the source data set as a likely fraudulent transaction may be provided, or in the case of a medical application, descriptors which indicate how to classify a medical record as indicating the likely presence of a particular disease may be provided. Individual ones of the records may comprise one or more attributes or fields, which may in some cases include or point to relatively high-level metadata such as keywords or transaction types. Note that, by itself, such metadata may be insufficient to classify the records with respect to at least some target classes; otherwise, the problem of classification may be trivially solved.

The source data set may be divided into a plurality of buckets based on one or more initial partitioning criteria (e.g., based on the kinds of high-level metadata indicated above) in some embodiments, with each bucket comprising one or more records. A plurality of two-phase learning iterations may then be executed on the source data set until a training completion criterion is met in various embodiments. A particular two-phase learning iteration may include (a) a bucket group selection phase and (b) a class boundary refinement phase in at least some embodiments. The bucket group selection phase may comprises identifying one or more positive-match buckets from the plurality of buckets, where a positive-match bucket includes at least one record labeled by one or more bucket annotators as a member of a target class. Any of a number of different criteria may be used to select candidate buckets for annotation in different embodiments—for example, some buckets may be selected as candidates based at least in part on output obtained from a first version of a classification model generated in the class boundary refinement phase of an earlier two-phase learning iteration, or a bucket may be selected as a candidate for annotation based at least in part on a similarity analysis with respect to one or more other buckets which have already been classified as positive-match buckets, and so on. In some embodiments, the results of search queries (e.g., generated automatically and/or by the bucket annotators) may be used to select buckets for annotation. One or more search engines (e.g., key-based lookup engines) may be configured in various embodiments, which use search indexes built on the attributes of the records of the data set, and such search engines may be used by the classification service to obtain the query results.

The class boundary refinement phase of the iteration may comprise selecting (using, for example, any combination of one or more active learning algorithms, such as query by committee or the like) a set of labeling-candidate records which meet a model enhancement potential criterion from among unlabeled records of the positive-match buckets identified in the bucket group selection phase in various embodiments. In effect, a subset of unlabeled records may be identified which, if/when labeled (either as positive or negative examples of a target class of interest), are predicted to enhance the quality or accuracy of the classification model more than other unlabeled records of the positive-match buckets. The class boundary refinement phase may also comprise obtaining class labels for the labeling-candidate records from one or more record-level annotators (e.g., either humans or annotator programs) and training an updated/enhanced version of the classification model using a training data set that includes at least some of the newly-annotated records. After the training completion criterion is met, the trained version of the classification model may be stored in various embodiments, e.g., at a repository of a classification service or machine learning service. The stored version of the model may be run to classify various records, at least some of which were not in the source data set.

In some embodiments in which any of several different ranking criteria are used to select buckets as annotation candidates, a random selection among the alternative ranking criteria may be used to select the next annotation candidate bucket at a given stage of the bucket group selection phase, so that the algorithm is not limited to always using the same type of selection methodology for candidate buckets. Similarly, different techniques (e.g., in some cases randomly-selected from a group of techniques including query-by-committee, uncertainty sampling and the like) may be used in different iterations for selecting labeling candidate records in the class boundary refinement phase. From within a particular bucket identified as a candidate for annotation, a sample comprising K records may be selected and provided to the bucket-level annotators in various embodiments; the size of the sample (K) may be changed from one iteration to another in at least some embodiments. In some embodiments, as a bucket-level annotator examines the K records, further examination of the remaining records may not be required as soon a positive example of a target class is found: e.g., if K=50 and the first positive example is found after the fifth record of the 50 is examined, the bucket may be labeled a positive-match bucket as soon as that first example is found, and the remaining 45 records may not need to be examined. In other embodiments, the bucket-level annotators may label (as positive or negative) each of the K records with respect to a target class, and the bucket may be labeled a positive-match bucket if at least one positive example of the target class is found.

In at least some embodiments, the membership of the buckets themselves may not change from one iteration to another—e.g., if a given record R1 is placed into bucket B1, that record may remain a member of B1 throughout the subsequent active learning iterations. In other embodiment, at least some bucket boundaries may also be redrawn from one iteration to another—e.g., 10 buckets may be created initially, 20 buckets may be defined after N1 iterations (e.g., in a third type of phase of the procedure, which occurs between the class boundary refinement phase of one iteration and the bucket group selection phase of the next iteration), 40 buckets may be defined after N2 iterations, and so on. The term "multi-phase" may be used to refer to iterations of an active learning based classification methodology which include at least the bucket group selection phase and the class boundary refinement phases, but may also include one or more other phases such as bucket boundary redefinition phases.

According to at least some embodiments, a programmatic request from a client of a classification service or a machine learning service may trigger the process of training the classifier. In at least some embodiments, such a machine learning service may help its clients identify the annotators, for the bucket-level annotations and/or for the record-level annotations. For example, the service may enable potential annotators to register as available annotators for various types of machine learning annotation tasks, and provide links to such available annotators to clients who wish to have labels generated for their records or buckets. In some cases, the same set of annotators may be used for bucket-level annotation and for record-level annotation; in other cases, different annotators may be employed for the respective phases of the multi-phase technique described above. In one embodiment, automated annotators (programs that are capable of labeling records) may be used for at least some phases or iterations.

As the multi-phase iterations proceed, the fraction of records and buckets that are annotated as positive matches for the target class(es) may increase in various embodiments. According to at least some embodiments, indications of the progress being made, with respect to the increase in labeled fractions, as well as the increase in the predictive quality of the classification models being trained in the class boundary refinement phases, may be provided via programmatic interfaces to clients of a classification service or machine learning service. The computing devices of the service may cause one or more graphical interfaces to be populated with respective indications of one or more metrics pertaining to the iterations in such embodiments, such as metrics indicating one or more of: (a) the number of labeled records as a function of completed phases/iterations, (b) the number of positive-match buckets as a function of completed phases/iterations, or (c) a classification quality metric (such as precision, recall, or AUC-PR (area under the precision-recall curve) etc.) as a function of completed phases/iterations. The iterative multi-phase active learning based techniques may be employed for binary classifiers and/or multi-class classifiers in various embodiments.

Example System Environment

FIG. 1 illustrates an example system environment in which a classification service may be implemented, according to at least some embodiments. As shown, system 100 comprises resources and artifacts of a network-accessible classification service 102, as well as one or more data sources 140 from which records that are to be classified at the service 102 may be obtained. Such systems, at which classification and/or other machine learning techniques are implemented, may be termed artificial intelligence systems in some embodiments. The classification service 102 may implement a set of programmatic interfaces 177, such as one or more web-based consoles, graphical user interfaces, command-line tools, application programming interfaces (APIs), and the like, which may be used by several different types of users or clients of the classification service 102 to interact with the service. Some users may submit programmatic requests via interfaces 177 from client devices 180A (e.g., laptops, desktops, mobile computing devices and the like) in classifier training setup sessions 181 to initiate the training of classification models for categorizing records generated at the data sources 140. Other users such as data scientists and the like may establish debugging or analysis sessions 182 from client devices 180B, for example using programmatic interfaces 177 to examine the progress being made during various iterations of a training algorithm, to debug potential problems associated with one or more classification algorithms, and so on. A third category of entities interacting with the classification service 102 may include annotators, responsible for labeling individual records and/or collections of records obtained from the data sources 140, e.g., to prepare training data sets for classification models. Such annotators may for example view descriptors of target classes (provided programmatically to the classification service by clients who wish to have classification models trained), representations of data records obtained from data sources 140, submit search queries, provide labels, and perform other types of operations from annotator devices 190 (which may also include laptops, desktops, mobile computing devices and the like) during labeling/annotation sessions 183 in the depicted embodiment. The messages transmitted to and from the classification service 102 may be processed by interaction interface managers 155, with internal messages corresponding to received requests being transmitted by the interface managers to other components of the service, and results obtained from the internal components being transformed for presentation to the clients/users by the interface managers.

The classification service 102 may include a training subsystem 130 as well as a run-time subsystem 170 at which trained classification models may be run in the depicted embodiment. A variety of algorithms may be included in a machine learning algorithm library 120 of the classification service 102, including a multi-phase active learning based classification algorithm 124 described below in further detail. One or more training and evaluation coordinators 174 (also referred to as model generators) implemented at a set of computing devices may utilize training resources 110 (e.g., compute engines including CPUs, GPUs and the like, as well as storage, memory and networking resources) to train classification models using algorithms from library 120 in the depicted embodiment. As part of the classification model development procedure, in at least some embodiments a subset of data sets obtained from data sources 140 may be identified for annotation, e.g., by labeling candidate selectors 150 implemented at one or more computing devices. In the embodiment depicted in FIG. 1, search queries used in selecting at least some data subsets (referred to as buckets) as labeling candidates may be processed by a search engine 152 configured at the classification service. In at least some embodiments, the classification service 102 may act as a repository of information about available annotators—for example, individuals wishing to provide annotation services may register with annotation orchestration managers 160, and the orchestration managers may provide information about such individuals to other clients who may utilize the annotators to label records for their classifiers. Once a classification model has been trained to a desired level of quality using algorithms from library 120, it may be stored in a repository 114 of trained models. Execution coordinators 175, implemented at one or more computing devices, may run trained versions of the models using model execution resources 132 to generate class predictions 160 with respect to various target classes in the depicted embodiment.

According to at least some embodiments, a client may initiate the training of one or more classification models using a multi-phase iterative active learning based classification algorithm 124 by submitting one or more model training requests via interfaces 177. The requests may indicate, for example, the data sources from which the unlabeled data is to be obtained, descriptors of one or more target classes into which records of a particular data set are to be categorized, and so on. In at least one embodiment, a model training request may specify the particular algorithm(s) to be used; in other embodiments, a training/evaluation coordinator 174 may select the classification algorithm, e.g., based on the size of the data set and/or the anticipated extent of the skew in the data set. In one embodiment, a client may indicate that the fraction of records of the data set which are expected to be true positives is low, and the multi-phase active learning based algorithm (which is well suited to such skewed data sets) may be selected by the training coordinators as a result.

In a scenario in which the multi-phase active learning based algorithm is selected for a given classification problem and data set, the records of the data set obtained from data sources 140 may be subdivided into buckets based on some set of initial partitioning criteria. The criteria may vary based on the available amount of descriptive information available about the records—e.g., if keywords and/or other metadata in natural language is available, natural language processing (NLP) algorithms may be used to decide the number and membership of an initial set of buckets. After the mappings between records and the buckets have been determined, a sequence of iterations may be conducted in the depicted embodiment, with each iteration comprising at least a bucket group selection phase followed by a class boundary refinement phase. At a high level, the bucket group selection phase may be described as the equivalent of eliminating a large fraction of the source data set from further consideration with respect to learning the characteristics of the target class(es), while the class boundary refinement phase may be considered the equivalent of fine-grained analysis, working within the smaller set of records retained for further analysis in the bucket group selection phase, to determine subtle distinctions pertaining to membership in the target class(es).

In the coarser analysis of the bucket group selection phase, the buckets of the source data set may be ranked relative to one another with respect to the probability of finding true positive examples of a target class, and records sampled from the higher-ranking buckets may be provided to a set of (automated or human) bucket-level annotators. If at least one true positive example is found in a bucket, the bucket may be designated as a positive-match bucket, and all the records of that bucket may be included in the domain to be analyzed in the class boundary refinement phase in some embodiments. Candidate buckets whose sampled records to be provided to the bucket-level annotators for labeling may be ranked/identified using any of a number of different techniques in different embodiments, including based on exploration of the source data set's buckets that have not been identified as positive-match buckets. A small number of unlabeled records may be selected as input for the currently-trained version of a classification model of an earlier iteration's class boundary refinement phase, for example, as part of such exploration, and the classification scores for the target class(es) of interest obtained from such a model may be used to identify candidate buckets for annotation in the current iteration's bucket group selection phase. Similarity analysis with respect to other buckets (such as those buckets already classified as positive-match buckets) may be used to identify annotation candidate buckets in some embodiments, while search queries (formulated using language models, and/or formulated by the bucket-level annotators) may be employed to find annotation candidate buckets in at least one embodiment. A randomized approach, in which a pseudo-random number is used to select which particular technique should be used to select the next bucket as a candidate for annotation, may be employed in some embodiments during the bucket group selection phase. The unlabeled record sample size (the specific number of records of an annotation candidate bucket to be provided to bucket-level annotators) may be varied from one iteration to another in at least some embodiments.

In at least some embodiments, the population of records which are to be potentially analyzed in the class boundary refinement phase using active learning approaches such as query-by-committee, uncertainty sampling and the like may be much smaller than the population of records of the source data set; much of the source data set may have been eliminated from further consideration for the current iteration during the coarse-grain analysis of the bucket group selection phase. From among this reduced population, a set of labeling candidate records which meet a model enhancement potential criterion may then be selected (e.g., using query-by-committee, uncertainty sampling, etc.) for the finer-grained annotation phase in the depicted embodiment, and provided to a set of record-level annotators. Class labels for at least some of the labeling candidate records may be obtained from the annotators, and used to determine a training set to be used to train the classification model(s) of the class boundary refinement phase further. After completion criteria for both phases have been met, further two-phase iterations may no longer be required, and a trained version of the classification model obtained using algorithm 124 may be stored in repository 114. The trained version may later be used to generate class predictions 160 for other records which were not part of the training data.

Information about the progress of the training procedure may be provided, e.g., in graphical form and/or in real time, via programmatic interfaces 177 in at least some embodiments. For example, as the training procedure proceeds, the fraction of records and/or buckets that have been labeled as positive and/or negative examples of target classes may be shown, changes in classification model quality metrics such as AUC-PR may be shown as a function of the number of completed phases or iterations, and so on.

Overview of Iterative Two-Phase Active Learning Technique

Figure 2:
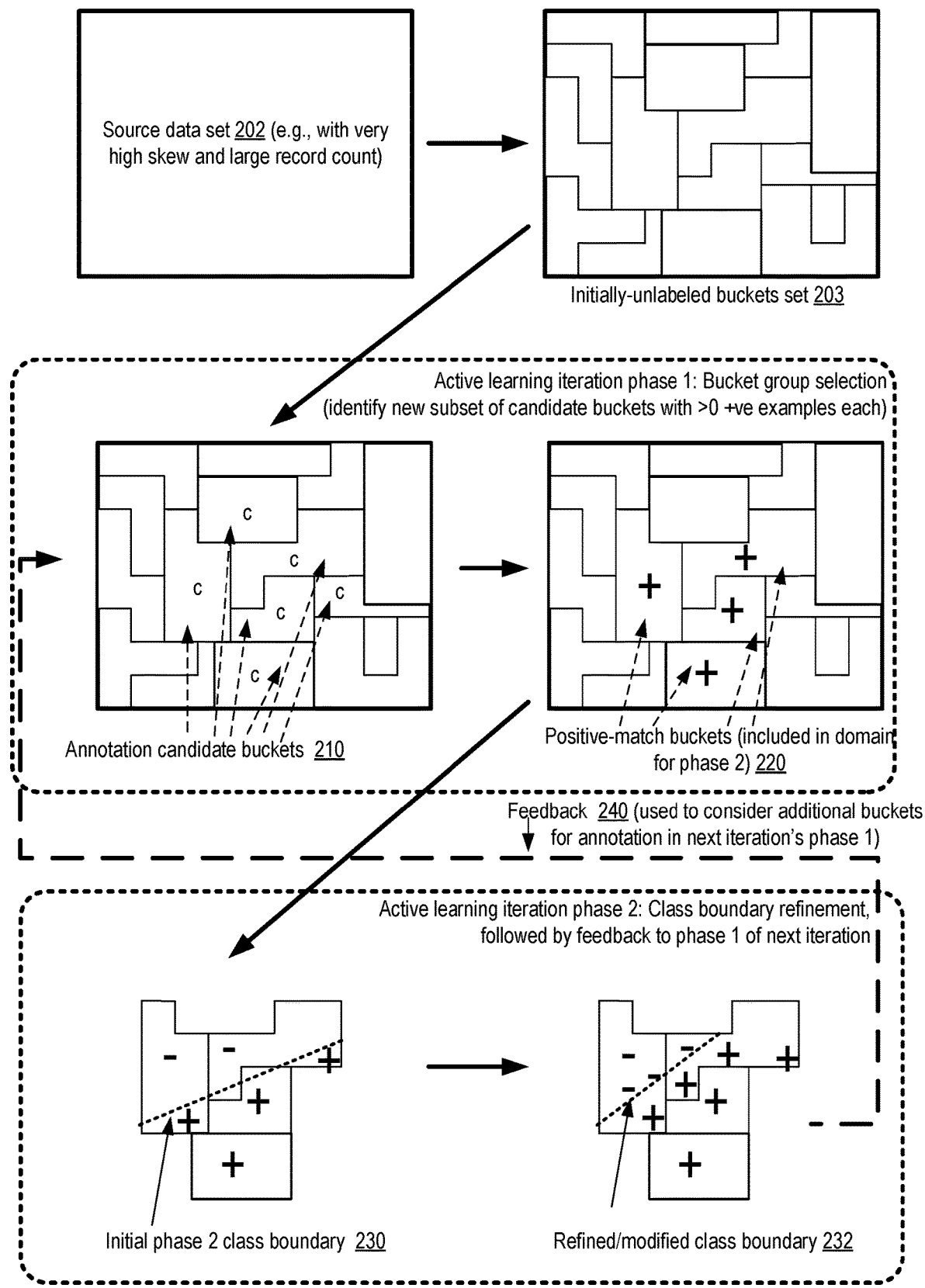
FIG. 2 illustrates an example overview of an iterative two-phase active learning based algorithm which may be employed for classification, according to at least some embodiments.

FIG. 2 illustrates an example overview of an iterative two-phase active learning based algorithm which may be employed for classification, according to at least some embodiments. A source data set 202, with numerous records (e.g., millions or even billions of records) and a highly-skewed or uneven distribution of target class members may be indicated by a client of a classification service in the depicted embodiment. For example, in a financial application, the fraction of transactions that represent examples of fraudulent actions of a particular type may represent a very small subset of a very large total number of transactions. Similarly, in a large collection of medical test results, only a very small fraction may represent examples of the occurrence of a particular rare disease.

From the source data set 202, a set 203 of buckets may be identified based on any of a variety of partitioning criteria in the depicted embodiment. For example, in some embodiments, a small set of keywords or key phrases may be associated with individual ones of the records, or an indication of a specific data source from which individual records were obtained, the times at which the records were created etc., may be available, and such information may be used to subdivide the source data set into buckets. The specificity and accuracy of the methodology used for creating the initial set of buckets 203 may not be crucial to the overall success of the iterative multi-phase active learning technique in various embodiments. For example, even a random assignment of records to buckets may be adequate in some embodiments as a reasonable starting point. In the embodiment depicted in FIG. 2, the assignment or mappings of records to buckets may not be modified after the initial step of identifying the buckets set 203 is completed. In other embodiments, bucket boundaries may be reorganized between at least some iterations of active learning—for example, more buckets may be created, records may be moved from one bucket to another, and so on based on additional partitioning criteria.

In active learning iteration phase 1, any of various ranking techniques may first be employed to identify a subset of buckets 210 (shown containing the letter "c," for "candidate") which are to be provided to a first set of annotators as candidates for labeling with respect to a target class. From individual ones of the annotation-candidate buckets, a number of records may be selected (e.g., at random, or using techniques similar to quart-by-committee or uncertainty sampling) and provided for analysis to the first set of annotators. If an annotator identifies at least one positive example of a target class (such as a fraudulent transaction in the financial example mentioned above) in a given candidate bucket, that bucket may be designated a positive-match bucket in the depicted embodiment, and included in the set of buckets to be provided as input to the class boundary refinement phase. The "+" symbols are used to indicate such positive-match buckets 220 in FIG. 2.

The records of the positive-match buckets 220 may be analyzed in the class boundary refinement phase (phase 2) of the iteration depicted in FIG. 2. A dotted line 230 represents a class boundary for a target class within the phase 2 input domain in FIG. 2; that is, using a version of a classification model trained in phase 2 of the previous iteration, records of the positive-match buckets may initially be classified as positive or negative examples of the target class on either side of the boundary (with the "−" sign indicating negative examples, and the "+" sign indicating positive examples of the target class). Using query-by-example, uncertainty sampling and/or other techniques, records that lie close to the boundary 230 may be selected as candidates for record-level annotation in the depicted embodiment. Such candidates may be selected for record-level annotation because they are harder to classify than other records which are easily categorized as positive or negative examples; greater certainty about their class membership would thus tend to lead to a larger improvement in the predictive ability of the classification algorithm if they were included in the model's next training set. Labels with respect to the target class may then be obtained for the selected candidate records near the class boundary 230 from a set of record-level annotators, and a new version of the training set for the classification model may be generated using the obtained labels. The classification model may be trained further using the improved training set (with more labeled records, as indicated by the larger count of "+" and "−" signs on the right than on the left in the phase 2 portion of FIG. 2), resulting in an improved version of the model and a refined/modified class boundary 232.

The enhanced version of the model may itself be used to provide feedback 240 to phase 1 of the next iteration of two-phase active learning in the depicted embodiment. For example, classification scores with respect to the target class for a sample of records that were in buckets which were not designated as positive-match buckets may be obtained using the improved version of the model, and such scores may be used to select new buckets as annotation candidates in phase 1 of the next iteration. Thus, in the embodiment depicted in FIG. 2, each phase of the process contributes input to, and hence influences, the operations of the next phase, helping lead to a rapid convergence of the classification model trained in phase 2 of the iterations. As a result of the alternating coarse-grained (bucket-level) annotations and fine-grained (record-level annotation at or near the class boundary) annotations, a training data set that enables a high-quality classification model to be generated may be obtained much more quickly than if only fine-grained analysis were to be performed in the depicted embodiment.

Example Alternative Lower-Level Methodologies

FIG. 3 illustrates example alternatives for lower-level methodologies which may be employed at various stages of an iterative two-phase active learning based classification procedure, according to at least some embodiments. As shown, techniques 301 used for the initial creation of buckets from a source data set may include keyword analysis 305, locality-sensitive hashing 311, language models 312, pre-existing semantics or hierarchies 313, and/or randomized bucketing 314. In some embodiments, natural language metadata which described the individual records of the source data set may be available, e.g., either included as attributes in the records themselves, or in external data structures. For example, in a medical application, keywords assigned to individual records may indicate the type of medical test or procedure represented, while in a financial application keywords may indicate the type of transaction represented, the kind of business entity involved (e.g., retail outlet vs. wholesale outlet vs. online store), and so on. In an application involving records of items available for purchase at an online retailer website, metadata such as the names of the items, the high-level item category name (e.g., "shoes" versus "books") etc. may be available.

High-level keywords associated with individual records, if available, may be analyzed to identify groups of records which are to be grouped into buckets in technique 305 in some embodiments. In some embodiments in which the dimensionality of the records of the source data set is high (e.g., each record contains a large number of attributes), locality-sensitive hashing 311 may be used to reduce the dimensionality of the data, and records with similar hash values may then be mapped to the same bucket. Locality-sensitive hashing has the advantages that (a) records representing similar items or objects tend to be mapped to the same buckets, (b) the similarity between two items or objects may be estimated based on the similarity of their hash values, and (c) the technique is efficient computationally. In some embodiments, respective keys may be associated with each of the buckets, and k-nearest neighbor maps may be created for each such key. Language models 312 may be created to discover neighboring buckets, and such neighborhood information may be used in the bucket group selection phases of the iterative two-phase active learning technique. In at least some example scenario pre-existing semantic information and/or hierarchical information 313 may be available, and may be used for bucketing at least some records. For example, if one of the attributes in the records of the data set is the name of a city in the United States, a natural way to organize the records into buckets may include grouping records by the state in which the cities lie, making use of the state-to-city semantic relationship. Similarly, for a data set representing items available at an e-retailing web site, a hierarchy of high level item categories (e.g., clothing→outerwear→raincoats) may already have been defined, and such hierarchical information may be used for bucketing. In some embodiments, at least some buckets may be generated using randomized bucketing 314, in which at least some records are assigned to randomly-selected buckets. In at least some embodiments, the output of the initial bucketing phase may include (a) mappings between individual records of the source data set and buckets and (b) neighborhood information indicating the relative similarities of different buckets. As mentioned earlier, in some embodiments, the source data set records may be subdivided into buckets using multiple different bucketing techniques (e.g., keyword-based bucketing, locality-sensitive-hashing based bucketing, language models-based bucketing, and so on), with each technique resulting in respective mappings between records and buckets. From among the multiple bucket sets generated using the respective bucketing techniques, any combination of buckets may be considered as candidates for bucket-level annotation in different embodiments in the bucket group labeling phase—that is, all the candidate buckets need not necessarily have been generated using the same bucketing technique.

In various embodiments, the buckets into which the source data set has been divided may be ranked relative to one another to identify the best candidates for bucket-level annotation. Bucket-ranking techniques 331 may include using the results of bucket annotator generated search queries 325, automatically generated/recommended search queries 328, neighborhood metadata 331 pertaining to the buckets, as well as target class scores or probabilities provided by phase 2 classification models of earlier iterations 334 in the depicted embodiment. The search queries, whether generated by the bucket-level annotators or generated automatically by the classification service, may be based on client-supplied descriptors of the target classes of the classification model being developed. For example, corresponding to a target class descriptor C1, a query Q1 may be generated automatically by a labeling candidate selector (similar to labeling candidate selectors 150 shown in FIG. 1), and the number of results (N1, N2, ..., Nk) obtained for Q1 from each of the buckets may be used to rank the buckets as candidates for phase-1 annotation in at least some embodiments. If a bucket Bi has more records returned in response to Q1 than bucket Bj, Bi may be considered more likely to be a positive-match for the target class, and thus may be ranked higher than Bj when selecting annotation candidate buckets. After at least some positive-match buckets have been identified, in some embodiments closer neighbors of the already found positive-match may be ranked higher as annotation candidates than more distant buckets, using neighborhood metadata 331 generated for the buckets of the source data set. After the first iteration of the two-phase active learning procedure is completed, a classification model (generated in phase 2 of the first iteration) may become available, and classification scores/probabilities 334 generated for randomly-selected unlabeled records of buckets which have not been labeled positive-match buckets may be employed to rank annotation candidate buckets in some embodiments. For example, if the model-generated probability of one or more records of bucket Bp being members of a target class is at least P1, and the probability of one or more records of bucket Bq being members of the target class is much less than P1, Bp may be ranked higher than Bq in some embodiments.

In phase 2, unlabeled records of positive-match buckets may be ranked as candidates for record-level labeling, e.g., in order of potential training/learning benefit or impact in various embodiments. Ranking techniques 341 for phase 2 may include query-by-committee 343, uncertainty sampling 345, expected model change 347, and expected error or variance reduction 349, among others, in the depicted embodiment. In query-by-committee 343, a number of variants of the classification model may be trained in phase 2 using the currently-labeled records of the positive-match buckets, and the class predictions/probabilities of the different models for various unlabeled records may be compared; those records for which the model variants disagree the most may then be ranked higher (as obtaining labels for such records from record-level annotators is likely to lead to greater enhancement of the classification models than obtaining labels for records on which all the models already agree). In uncertainty sampling 345, those records for which the current version(s) of the classification model are least certain may be ranked higher than others. In expected model change 347, those unlabeled records whose labels (if obtained from the annotators) are likely to change model parameters most may be ranked higher than others. In expected error or variance reduction techniques 349, those unlabeled records whose labels (if obtained from the annotators) are likely to reduce model result variance or error most may be ranked higher. Other techniques than those shown in FIG. 3 may be employed in some embodiments for phase 1, phase 2 and/or the initial bucketing stage of the iterative two-phase active learning based classification procedure.

Methods for Classification Using Iterative Two-Phase Active Learning

Figure 4:
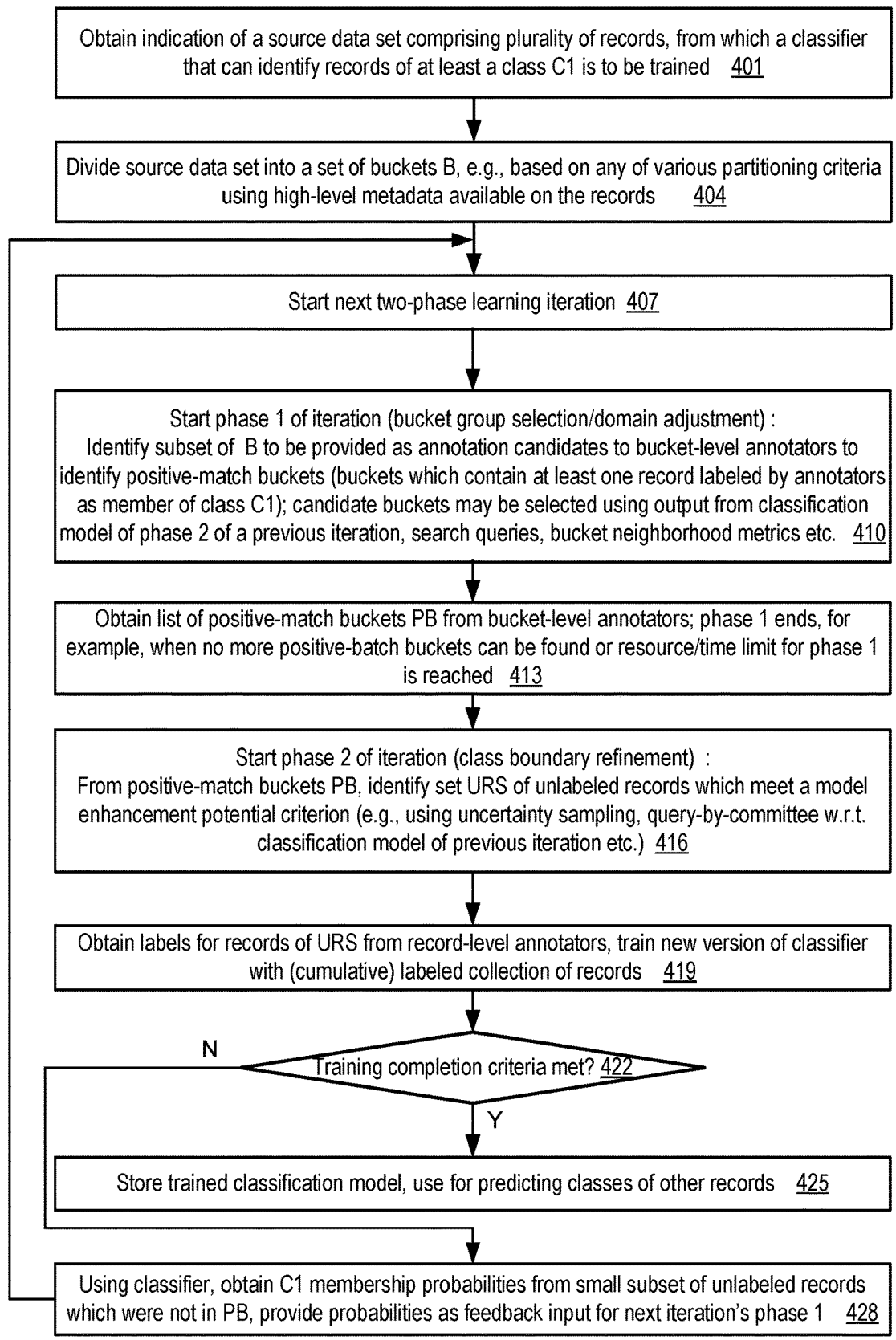
FIG. 4 is a flow diagram illustrating aspects of operations that may be performed to train and utilize classification models using two-phase active learning, according to at least some embodiments.

FIG. 4 is a flow diagram illustrating aspects of operations that may be performed to train and utilize classification models using two-phase active learning, according to at least some embodiments. As shown in element 401, an indication of a source data set comprising multiple records may be obtained, e.g., via one or more programmatic interfaces of a network-accessible classification service or machine learning service in some embodiments. The source data set may be intended to be used for training a classifier that can identify records of one or more target classes including a particular class C1 in the depicted embodiment. In many cases, the source data set may be very large, while the fraction of its records that are positive examples of C1 may be very low. In at least some embodiments, a respective descriptor of the one or more target classes may also be obtained via programmatic interfaces.

The source data set may be divided into a set of buckets B in the depicted embodiment (element 404). Any of a number of techniques may be employed for the initial bucketing in different embodiments—for example, the partitioning criteria used to place records into buckets may rely on keyword analysis of keywords are available for the individual records, or hashing algorithms (such as location-sensitive hashing) may be used to reduce the dimensionality of the data and map the records to buckets based on similar hash values. In at least some embodiments, high-level metadata such as keywords or brief descriptions of the records may be available, and the records may be mapped to buckets based at least in part on such metadata.

After the mappings of records of the source data set to buckets has been completed, a plurality of two-phase learning iterations may be performed or executed in various embodiments. Element 407 indicates the start of the next two-phase learning iteration. The first phase of the iteration, which may be referred to as a bucket group selection phase or a domain adjustment phase, may be started (element 410). A subset of B to be provided as annotation candidates to one or more bucket-level annotators may be identified in at least some embodiments using any of various bucket ranking criteria. The objective of providing the annotation candidate buckets to the bucket-level annotators (which may include automated annotation programs and/or a set of human annotators) may be to identify positive-match buckets in the depicted embodiment. Any candidate bucket in which at least one record is identified as a positive example of target class C1 may be designated as a positive-match bucket in some embodiments. In other embodiments, out of a collection of K records provided to the bucket-level annotators, a minimum of N positive examples of C1 (where N>1) may have to be identified in order to designate the bucket as a positive-match bucket. Ranking criteria used to select annotation candidate buckets from the source data set may include, for example, class probabilities or other output produced for individual ones of the buckets' records using a version of a classification model trained in a previous iteration's class refinement phase, results of automatically-generated or annotator-generated search queries based on C1 class descriptors, neighborhood or distance metrics computed with respect to other buckets which have already been designated as positive-match buckets, and so on in different embodiments.

A list or set PB of positive-match buckets may be obtained from the bucket-level annotators in the depicted embodiment in phase 1 of the iteration (element 413). Any of a number of termination criteria may be used for ending phase 1: e.g., when no new positive-match buckets can be found from among the annotation candidates, when the time or resource limit for phase 1 has been reached, and so on.

Phase 2 of the iteration, also referred to as the class boundary refinement phase, may then be initiated using the set of positive-match buckets as input (element 416). In effect, the domain over which analysis is to be performed to train the classification model in phase 2 is reduced from the entire source data set to the positive-match buckets by phase 1. From the records of the positive-match buckets, an unlabeled record set URS which meets one or more model enhancement potential criteria may be identified for labeling or annotation in the depicted embodiment, e.g., using any of various active learning techniques such as uncertainty sampling, query-by-committee or the like, using the currently-trained version of the model if one exists. The set of candidate records selected for annotation may be referred to as labeling-candidate records in some embodiments. Labels for at least some of the records of the URS may be obtained from one or more record-level annotators (element 419), and a new version of the classification model may be trained using a training set which includes the newly-annotated or newly-labeled records. In some embodiments, the positive-match buckets may already include some records with labels (obtained in earlier iterations, or provided by the bucket-level annotators in phase 1), and such already-labeled records may also be included in the training data set.

After the classification model is trained in phase 2, it may be evaluated to determine whether one or more model quality criteria are satisfied. If such criteria are satisfied, and the completion criteria for both phases are met (as detected in operations corresponding to element 422), further iterations may not be required. The trained version of the classification model corresponding to the final iteration may be stored in the depicted embodiment (element 425) and used as desired to generate class predictions for additional records. In some embodiments, multiple versions of the classification models, corresponding to respective iterations, may be stored or retained and provided in response to programmatic requests from clients of the classification service. In additions to the models themselves, associated results, hyper-parameter files, and the like may also be stored and made available to clients in such embodiments. This may enable clients to compare the versions of the models and select the particular versions of the models they wish to use; for example, a particular version that was generated before the final training iteration may have some properties or metrics which make that version a better choice from the perspective of one client than the final trained version.

If training completion criteria are not met, as also detected in operations corresponding to element 422, respective probabilities or scores with respect to membership in C1 may be obtained using the classification model for a small subset of unlabeled records which were not in the positive-match buckets (element 428). These scores or probabilities may be provided as feedback or input for the phase 1 operations of another two-phase iteration. Operations corresponding to elements 407 onwards may then be performed for the next iteration.

Figure 5:
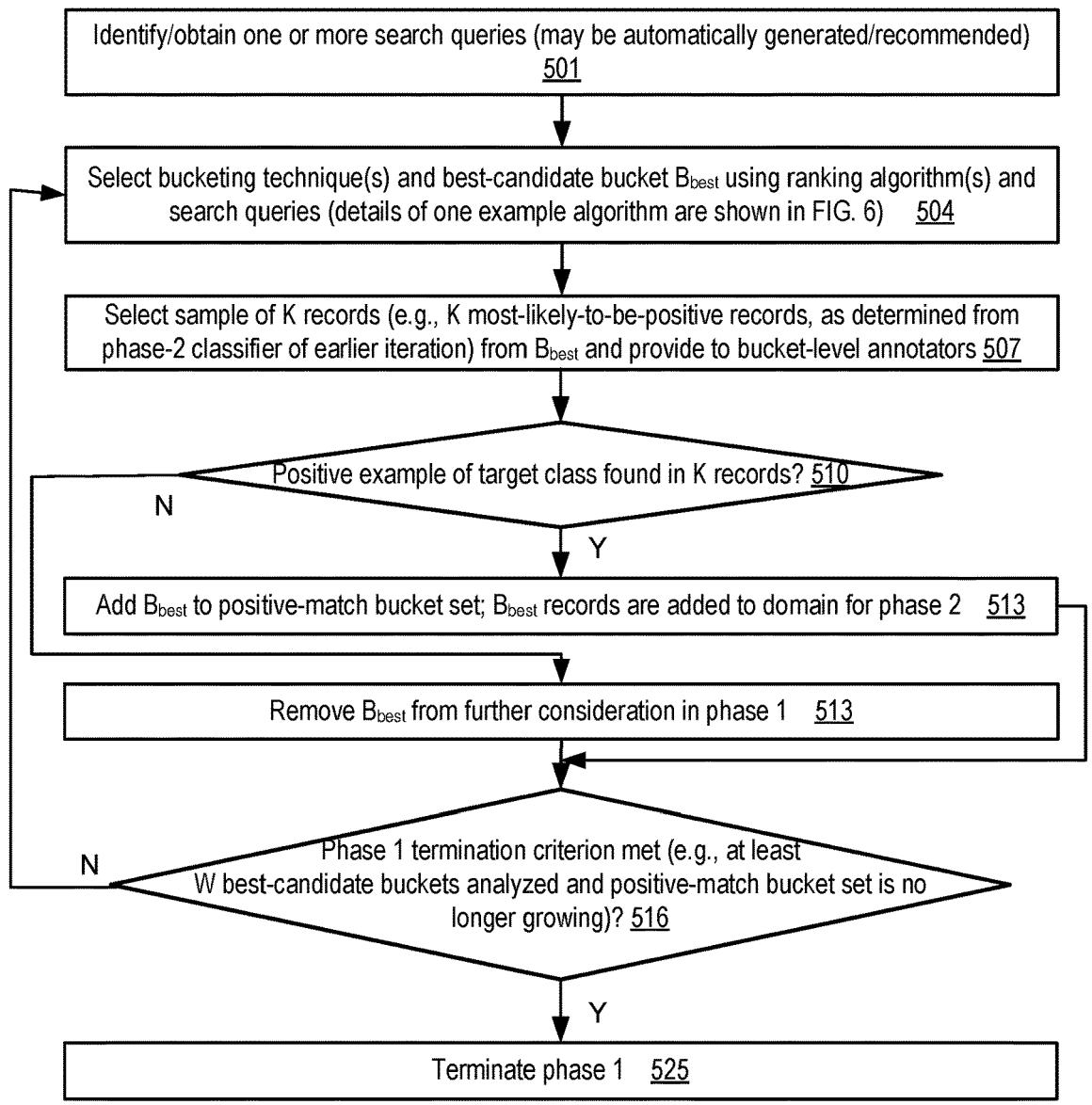
FIG. 5 is a flow diagram illustrating aspects of operations that may be performed during a bucket group selection phase of a two-phase active learning algorithm, according to at least some embodiments.

FIG. 5 is a flow diagram illustrating aspects of operations that may be performed during a bucket group selection phase of a two-phase active learning algorithm, according to at least some embodiments. As shown in element 501, one or more search queries usable to search for potential positive examples of a target class may be identified for phase 1 of an iteration. In some embodiments one or more queries may be automatically generated or recommended by components of the classification service being used, e.g., based on natural language analysis of descriptors of the target class. In other embodiments, at least some of the queries may be generated or composed by annotators selected for phase 1 operations.

From among the currently-unlabeled buckets of the source data set, which may in some cases have been defined using several different bucketing techniques, the particular bucketing technique(s) to be used, as well as the best candidate bucket for annotation $B_{best}$ among the buckets generated using the technique(s) may be identified using one or more ranking algorithms (element 504) and the search queries in the depicted embodiment. Details of one ranking methodology which may be employed in some embodiments are discussed in the context of the description of FIG. 6 below.

A sample of K records may be selected from $B_{best}$ in the depicted embodiment (element 507) and provided to one or more bucket-level annotators. If at least one positive example of the target class is identified by the bucket-level annotators among the K records in the depicted embodiment, as determined in operations corresponding to element 510, $B_{best}$ may be added to a positive-match bucket set, thus incorporating the records of $B_{best}$ into the domain for which finer-grained analysis is to be performed in phase 2 of the current iteration. If no positive examples of the target class are identified by the annotators in the sample of K records, as also detected in operations corresponding to element 510, $B_{best}$ may be removed from further consideration in phase 1 of the current iteration (element 513). Note that the sample size K may be varied from one iteration to another—e.g., in phase 1 of iteration I, a sample of N1 records may be selected from $B_{best}$, while in phase 1 of iteration (I+1), a sample of N2 records may be selected from $B_{best}$, where N2 is different from N1. In some embodiments, the sample size K may also be varied from one annotation candidate bucket to another within the same bucket group selection phase. The extent to which K is to be varied, and the manner in which it is to be varied, may be governed by hyper-parameters of the iterative two-phase technique in some embodiments. In at least one embodiment, such hyper-parameters may be selected by a client of the classification service. In other embodiments, at least some hyper-parameters may be selected by the classification service automatically. The specific set of K records to be included in the sample may be selected at random in some embodiments. In other embodiments, a version of the phase 2 classification model from a previous iteration may be used to generate target class probabilities or scores for at least some records of $B_{best}$, and the results may be used to select a sample of size K (e.g., records with higher predicted probabilities of membership in the target class may be selected in preference to others). In effect, the phase 2 classification model from an earlier iteration may be used to estimate the respective probabilities that various unlabeled records of $B_{best}$ are members of the target class; using such probability estimates, the K records which are most likely to be labeled positive may be identified and provided to the annotators for bucket-level labeling purposes in such embodiments.

After $B_{best}$ annotation results are obtained from the bucket-level annotators, one or more phase 1 termination criteria may be checked (element 516). For example, if at least W best-candidate buckets have been analyzed thus far in the iteration, where Q is a hyper-parameter, and the positive-match bucket set is no longer growing, phase 1 may be terminated (element 525) for the current iteration in the depicted embodiment. In other embodiments, criteria such as time limits or resource consumption limits may be used to terminate phase 1. If the termination criteria are not satisfied, another best-candidate bucket may be selected from among the remaining unlabeled buckets, and operations corresponding to elements 504 onwards may be repeated.

Figure 6:
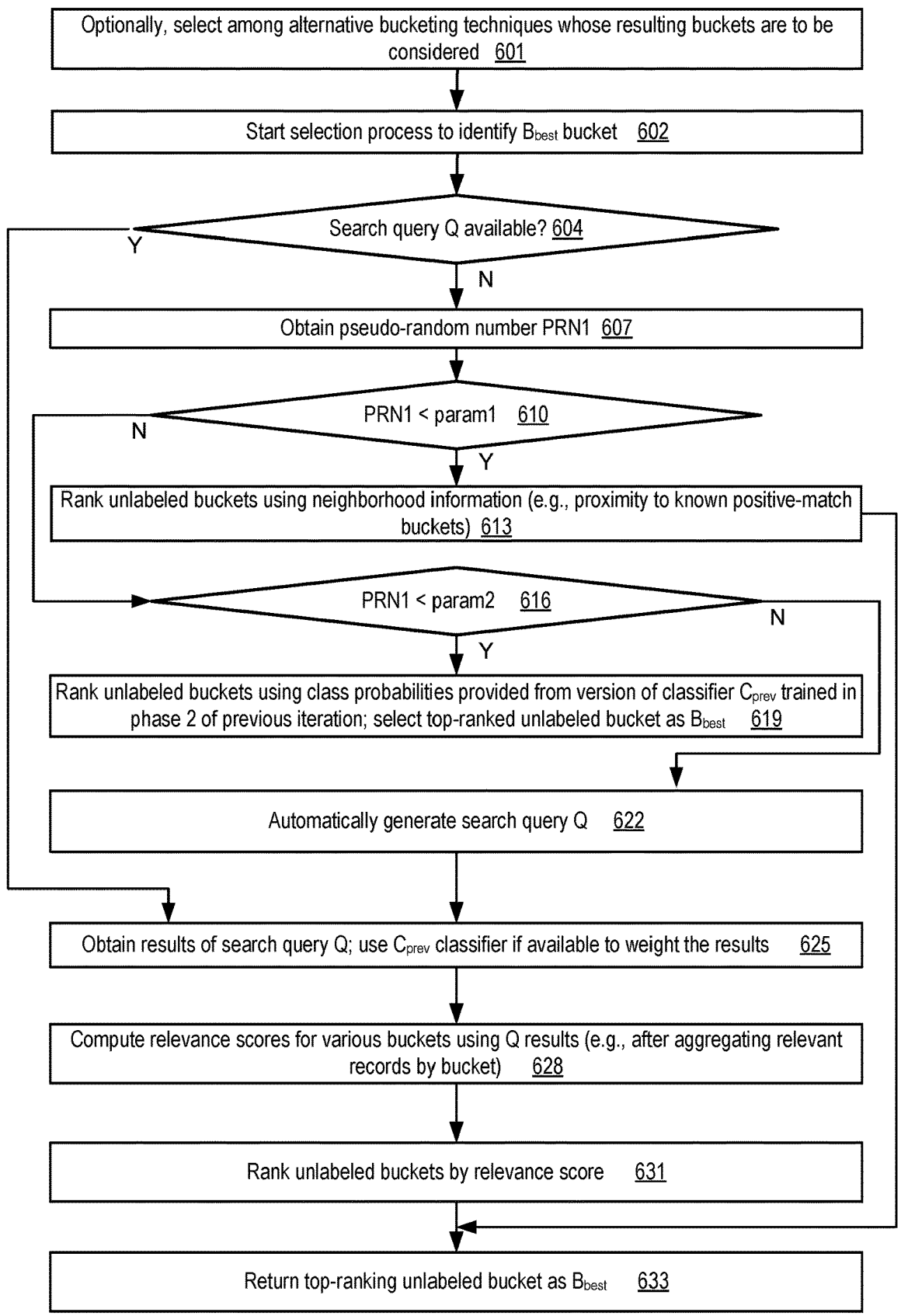
FIG. 6 is a flow diagram illustrating aspects of operations that may be performed to identify a candidate bucket as an annotation candidate during a bucket group selection phase, according to at least some embodiments.

FIG. 6 is a flow diagram illustrating aspects of operations that may be performed to identify a candidate bucket as an annotation candidate during a bucket group selection phase, according to at least some embodiments. As shown in element 601, in scenarios in which multiple bucketing techniques may have been used to subdivide the source data set in different ways, with each bucketing technique resulting in a respective collection of buckets, the particular bucketing technique(s) whose resultant buckets are to be considered as candidates for annotation may be selected. For example, in an embodiment in which multiple bucketing techniques BT1 and BT2 were used, in a given iteration, buckets identified using either or both of the techniques may be selected as the best candidates for annotation. The selection process or procedure for identifying the $B_{best}$ bucket (the bucket to be considered next for annotation in phase 1 of the current iteration of the two-phase active learning based technique) may then be begun (element 602). If a search query Q for the target class is available (as detected in operations corresponding to element 604), the query may be executed with respect to the records of unlabeled buckets of the source data set.

The results of the search query Q may be obtained (element 625), indicating some number of records that appear to be members of the target class. If a classification model $C_{prev}$ has been trained in phase 2 of a previous iteration, the records identified via the query Q may be supplied as input to $C_{prev}$ and the class probabilities produced by $C_{prev}$ for the records may be used to assign respective weights to the records. Relevance scores for various buckets may then be computed (e.g., using the weighted results of the query Q, or if $C_{prev}$ is not available, using the raw unweighted results) (element 628). For example, if bucket B1 has 500 records returned in response to query Q, and the sum of the class probabilities of the 500 records assigned by $C_{prev}$ is 450, a relevance score of 450 may be assigned to B1. Continuing the example, if bucket B1 has 600 records returned in response to query Q, and the sum of the class probabilities of the 600 records assigned by $C_{prev}$ is 420, a relevance score of 420 may be assigned to B2. The unlabeled buckets may then be arranged/ranked in order of decreasing relevance scores (element 631), and the top-ranked bucket may be designated as $B_{best}$ and selected as the next annotation candidate bucket to be present to the bucket-level annotators in phase 1 of the current iteration (element 633).

If a search query is not available (as also detected in operations corresponding to element 604), a probabilistic or randomized approach may be taken towards identifying $B_{best}$ in the depicted embodiment. A pseudo-random number PRN1 may be obtained (element 607) from one or more pseudo-random number generators, and the value of PRN1 may be used to determine how to proceed with respect to identifying $B_{best}$. If PRN1 (which may, for example, be a real number between 0 and 1) is smaller than a parameter param1 (as detected in operations corresponding to element 610), neighborhood information (such as distance metrics computed for pairs of buckets) may be used to rank the buckets (element 613). For example, the currently-unlabeled bucket which is closest (based on one or more distance criteria) to some bucket which has already been labeled as a positive-match bucket may be selected as $B_{best}$ using such a ranking methodology.

If PRN1 is no smaller than param1 but is smaller than param2 (as determined in operations corresponding to the combination of elements 610 and 616), the unlabeled buckets may be ranked using class probabilities of selected records of the buckets, obtained from a version of the classification model $C_{prev}$ trained in phase 2 of a previous iteration in the depicted embodiment. Thus, if the sum of the $C_{prev}$-generated class probabilities with respect to the target class for records of bucket B1 exceeds the sum of the generated class probabilities with respect to the target class for records of bucket B2, B1 would be ranked higher than B2. The top-ranked unlabeled bucket may then be selected as $B_{best}$ (element 619).

If PRn1 is no smaller than PRN2 (as also detected in operations corresponding to element 616), a search query Q may be automatically generated, e.g., using a descriptor of the target class. Operations corresponding to elements 625 onwards may then be performed using the automatically-generated query to identify $B_{best}$.

Figure 7:
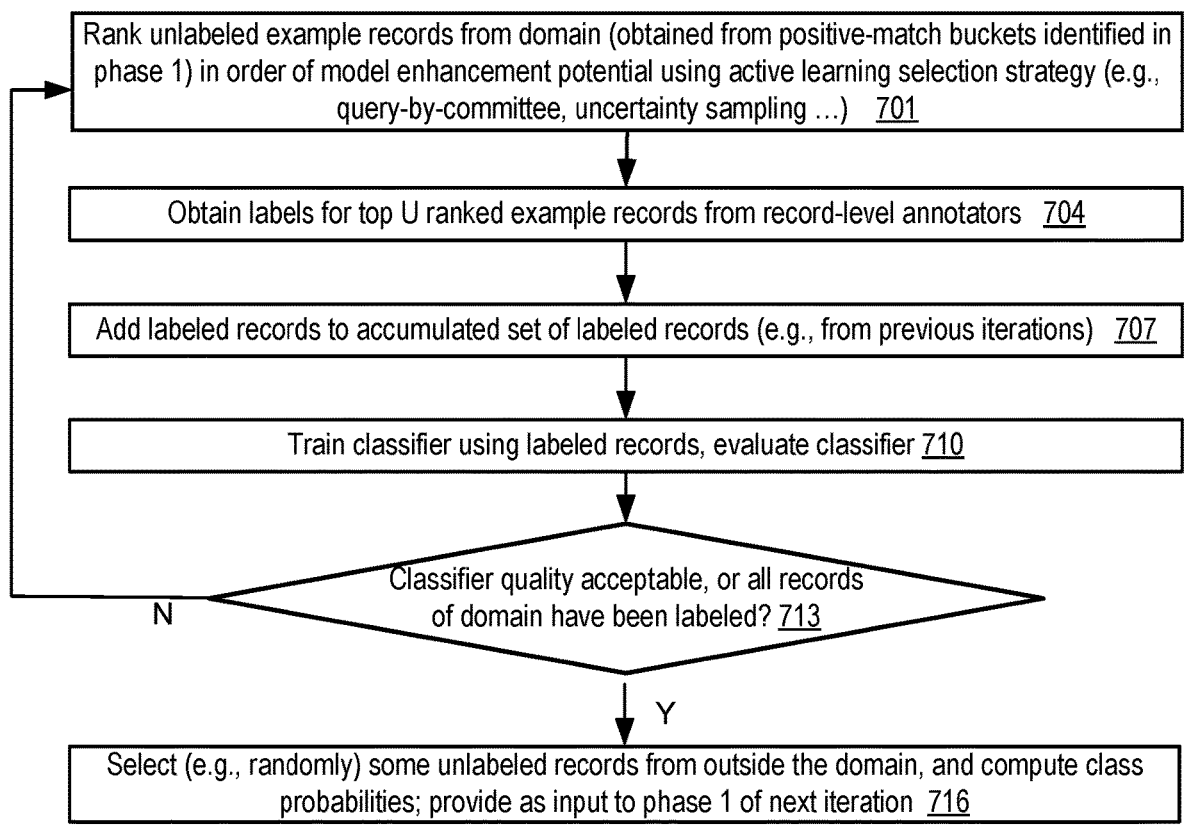
FIG. 7 is a flow diagram illustrating aspects of operations that may be performed during a class boundary refinement phase of a two-phase active learning algorithm, according to at least some embodiments.

FIG. 7 is a flow diagram illustrating aspects of operations that may be performed during a class boundary refinement phase of a two-phase active learning algorithm, according to at least some embodiments. As shown in element 701, at least a subset of unlabeled example records from the domain identified in phase 1 of the current iteration (the positive-match buckets provided as output from phase 1) may be ranked in order of model enhancement potential using one or more active learning selection strategies such as query-by-committee, uncertainty sampling, etc. In some embodiments, the particular active learning algorithm to be used may be selected at random from a set of candidate strategies;

as a result, different active learning algorithms may potentially be used in respective iterations.

Respective labels for the top U ranked example records may then be obtained from a set of record-level annotators (element 704). The labeled records (which may include both positive examples and negative examples) may be added to an accumulated set of labeled records (e.g., obtained during previous iterations or during phase 1 of the current iteration) (element 707). The classification model may then be trained using a training set which contains at least a subset of the labeled records, and evaluated using a test set which also includes labeled records (element 710).

If the classifier quality is found acceptable, or if all the records of the domain have been labeled, the training of the current version of the classifier in phase 2 may be terminated in the depicted embodiment (element 713). In some embodiments, other termination criteria based on elapsed time or resource consumption limits may be used to stop further training of the classifier. If the termination criteria have not yet been met (as also determined in operations corresponding to element 713), more labeling candidate records may be identified and operations corresponding to elements 701 onwards may be performed with respect to additional labeling candidates from the domain.

After the training of the classification model has been completed for the current iteration, some number of unlabeled records from outside the domain (i.e., from buckets which were not identified as positive-match buckets in phase 1 of the current iteration) may be selected. Class scores with respect to the selected records may be generated using the version of the classification model trained in the current phase 2, and included as input or feedback for phase 1 of the next iteration (element 716) in the depicted embodiment.

It is noted that in various embodiments, some of the operations shown in FIG. 4, FIG. 5, FIG. 6 and/or FIG. 7 may be implemented in a different order than that shown in the figures, or may be performed in parallel rather than sequentially. Additionally, some of the operations shown in FIG. 4, FIG. 5, FIG. 6 and/or FIG. 7 may not be required in one or more implementations.

Example Programmatic Interactions

Figure 8:
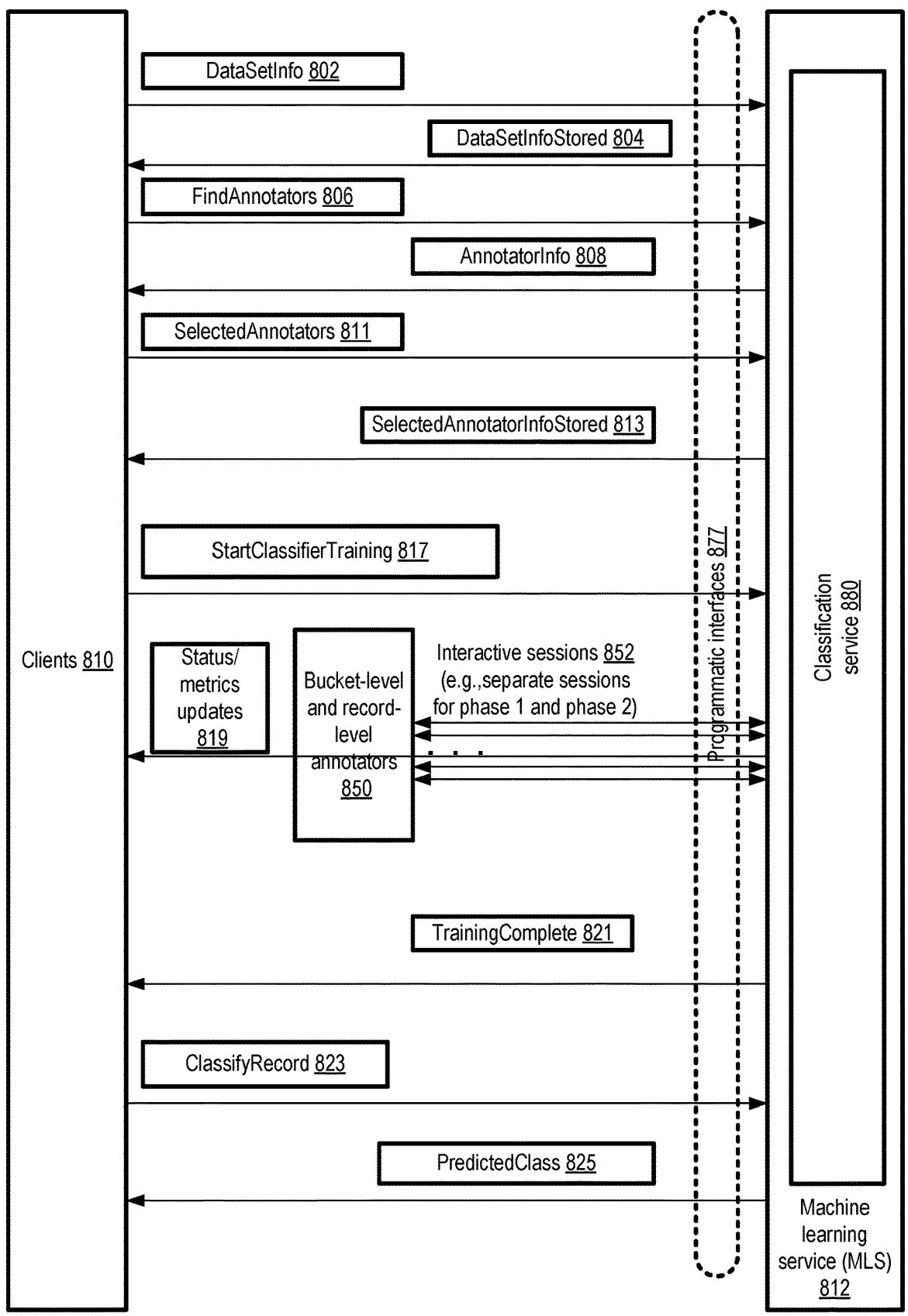
FIG. 8 illustrates example programmatic interactions between a client and a classification service, according to at least some embodiments.

FIG. 8 illustrates example programmatic interactions between a client and a classification service, according to at least some embodiments. A classification service 880 which supports iterative two-phase active learning techniques, similar in features and functionality to classification service 102 of FIG. 1, may implement one or more programmatic interfaces 877 in the depicted embodiment, enabling clients 810 to submit various requests pertaining to classification models, and to receive corresponding responses. The programmatic interfaces may include, among others, a set of application programming interfaces (APIs), web-based consoles, command-line tools, graphical user interfaces, and the like in different embodiments. In the depicted embodiment, the classification service 880 may be implemented as part of a broader machine learning service 812, e.g., supported at a provider network or cloud computing environment. In other embodiments, the classification service 880 may not necessarily be part of such a more general machine learning service.

A client 810 may submit information about a source data set in a DataSetInfo message 802 in some embodiments to the classification service 880 via the programmatic interfaces 877. One or more data sources from which records are to be obtained and used for training classification model(s) may be indicated in message 802. For example, in one embodiment the records may be stored at storage devices of a network-accessible storage service of a provider network, and addresses or identifiers of the storage devices may be provided. In some embodiments, the DataSetInfo message 802 may include descriptors of one or more target classes for which the model(s) are to be trained. In some cases individual records of the data set may include high-level descriptive metadata such as keywords as attributes; in other embodiments, the records may contain abbreviated encodings of the high-level metadata, and the actual metadata nay be stored elsewhere. For example, in the case of a retailing application, the metadata may include descriptions of individual items of an inventory, or high-level item categories such as "shoes", "hats", "gloves" etc. The information about the data set may be stored, and a DataSetInfoStored message 804 may be sent to the client as an acknowledgement in some embodiments.

In at least some embodiments, the classification service 880 may serve as a broker or intermediary between individuals who can annotate records, and the clients who wish to have their data sets annotated. A FindAnnotators request 806 may be submitted by a client in some embodiments, in effect requesting the classification service to provide indications of some set of annotators who may be appropriate for the bucket-level and/or record-level annotation tasks to be performed on behalf of the client. In response, the classification service may identify a set of annotators who have registered with the service, and provide information about the annotators to the client in the form of one or more AnnotatorInfo messages 808. The client 810 may then select or approve some number of annotators (e.g., after contacting individual ones of the annotators via the classification service), and send a SelectedAnnotators message 811 to the service indicating the specific annotators to be used during the phases of the active learning-based classification model training in the depicted embodiment. In response, the classification service 880 may store the information about the annotators, and send a SelectedAnnotatorInfoStored message 813 in at least some embodiments. Note that in at least one embodiment, one or more of the annotators used in the bucket group selection phases and/or the class boundary refinement phases may comprise programs; as such, at least some of the annotation tasks may be performed without the help of human annotators in such embodiments. In one embodiment the classification service may provide a library of annotation programs (e.g., comprising neural network-based machine learning models or the like), and clients 810 may utilize some of the annotation programs of the library.

A client may submit a StartClassifierTraining message 817 to kick off the procedure of training one or more models using the iterative two-phase technique introduced above in the depicted embodiment. In at least some embodiments, a number of hyper-parameters may be specified in the StartClassifierTraining message 817, such as the techniques/algorithms to be used for initial bucketing of the source data set, the algorithms to be used to identify annotation candidate buckets, the manner in which record samples are to be identified within the annotation candidate buckets and the size(s) of such samples, the active learning algorithm to be used in the class boundary refinement phase, the classification algorithm to be used for the model trained in the class boundary refinement phase, the number of records for which class scores/probabilities are to be provided as feedback to the next iteration's bucket group selection phase from the class boundary refinement phase, the metrics or criteria to be used to determine when to stop each phase of a given iterations and the overall procedure, and so on.

In response to the StartClassifierTraining request 817, the classification service 880 may initiate an iterative training procedure similar to that discussed earlier, e.g., in the context of FIG. 2. The source data set for which the classifier is to be trained may be subdivided into buckets, and iterations of the bucket group selection and class boundary refinement phases may be started. A number of interactive sessions 852 may be established between the classification service 880 and annotators 850 (e.g., bucket-level annotators for the bucket group selection phases, and record-level annotators for the class boundary refinement phases) in the depicted embodiment. In at least some embodiments, the programmatic interfaces 877 may enable multiple annotators to be utilized concurrently (for bucket-level annotation, and/or for record-level annotation), thereby helping to speed up the overall process substantially for large data sets. Status information 819 about the progress of the training, as well as metrics obtained thus far from the training, may be provided via the programmatic interfaces to the clients 810 in at least some embodiments.

After the termination criteria for the model training have been met, a trained version of the classification model(s) developed using the iterative multi-phase active learning procedure may be stored at a repository of the classification service, and a TrainingComplete message 821 may be sent to a client 810 in some embodiments. Subsequently, the client may submit respective ClassifyRecord requests 823 indicating records for which classification is to be performed using the stored version of the model(s), and the classification service may provide an indication of the results obtained from the model(s) using a PredictedClass messages 825. In some embodiments, programmatic interactions other than those depicted by way of example in FIG. 8 may be supported by a classification service.

Example Data Presented Via Graphical User Interfaces

Figure 9:
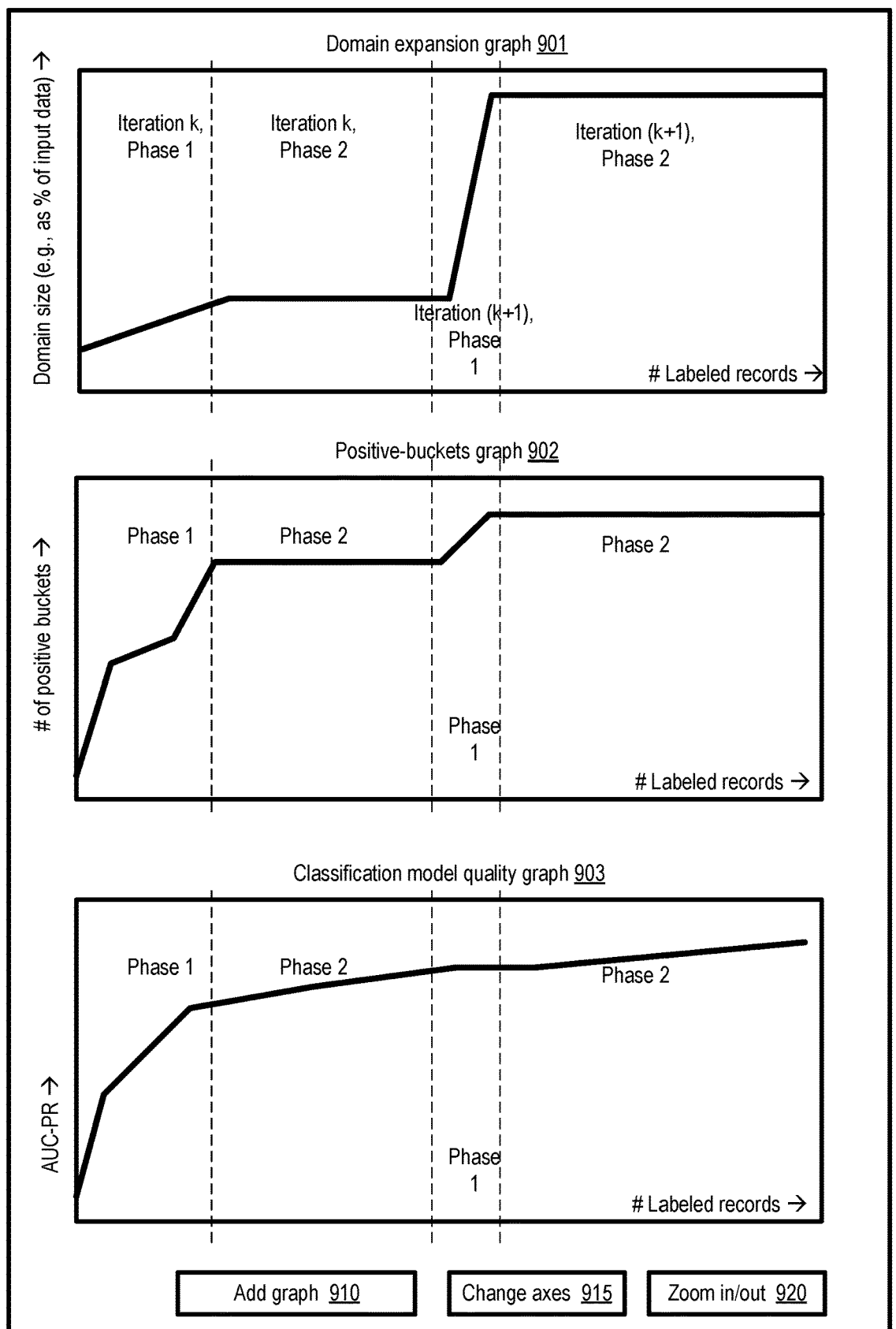
FIG. 9 illustrates example contents of a graphical user interface which may be provided by a classification service, according to at least some embodiments.

FIG. 9 illustrates example contents of a graphical user interface which may be provided by a classification service, according to at least some embodiments. In at least some embodiments, as mentioned earlier, a classification service may provide information via one or more programmatic interfaces about the status of an ongoing classification training procedure in which the iterative two-phase active learning techniques introduced above is being used. An interactive display 901 may be used to present such information graphically in the embodiment depicted in FIG. 9.

The interactive display 901 may comprise a number of control elements, such as an "Add graph" control element 910, "Change axes" control element 915 and/or a "Zoom in/out" control element 920 in the depicted embodiment, which can be used by the client to organize and explore the displayed information. By way of example, three types of graphs are shown in FIG. 9: a domain expansion graph 901, a positive-buckets graph 902, and a classification model quality graph 903. The X-axis of each of the example graphs may indicate completed phases (labeled phase 1 and phase 2) of various iterations of the procedure (e.g., iterations k and (k+1)). Vertical dashed lines indicate the completion of individual phases in the graphs 901, 902 and 903.

Along the Y-axis of graph 901, the domain size, expressed as the number of labeled records as a fraction of the total source data set, is shown. Similarly, the number of buckets (as a fraction of the total number of buckets) which have been annotated as positive-match buckets may be indicated along the Y-axis of graph 902. A classification model quality metric (such as area under the precision-recall curve or AUC-PR) may be represented along the Y-axis of graph 903. Other types of metrics, selected by the client, may be displayed as desired, and the scale, size and/or relative positions of the graphs may be modified if desired by the client.

Using the types of graphical displays illustrated in FIG. 9, a client may be able to check on the improvements in the quality of the classification models being developed as a function of the iteration count and phases completed in various embodiments. A client may be able to estimate, for example, how much additional improvement is probable in model quality, and may decide to terminate the training by issuing a programmatic command if the attained model quality is sufficient relative to the marginal benefits which may be obtained via further training. In some embodiments, other types of information may be shown along the X-axes of the graphs in addition to or instead of the iteration and phase counts, such as total elapsed, total CPU or other resources consumed, total annotation costs, and so on.

Example Provider Network Environment

Figure 10:
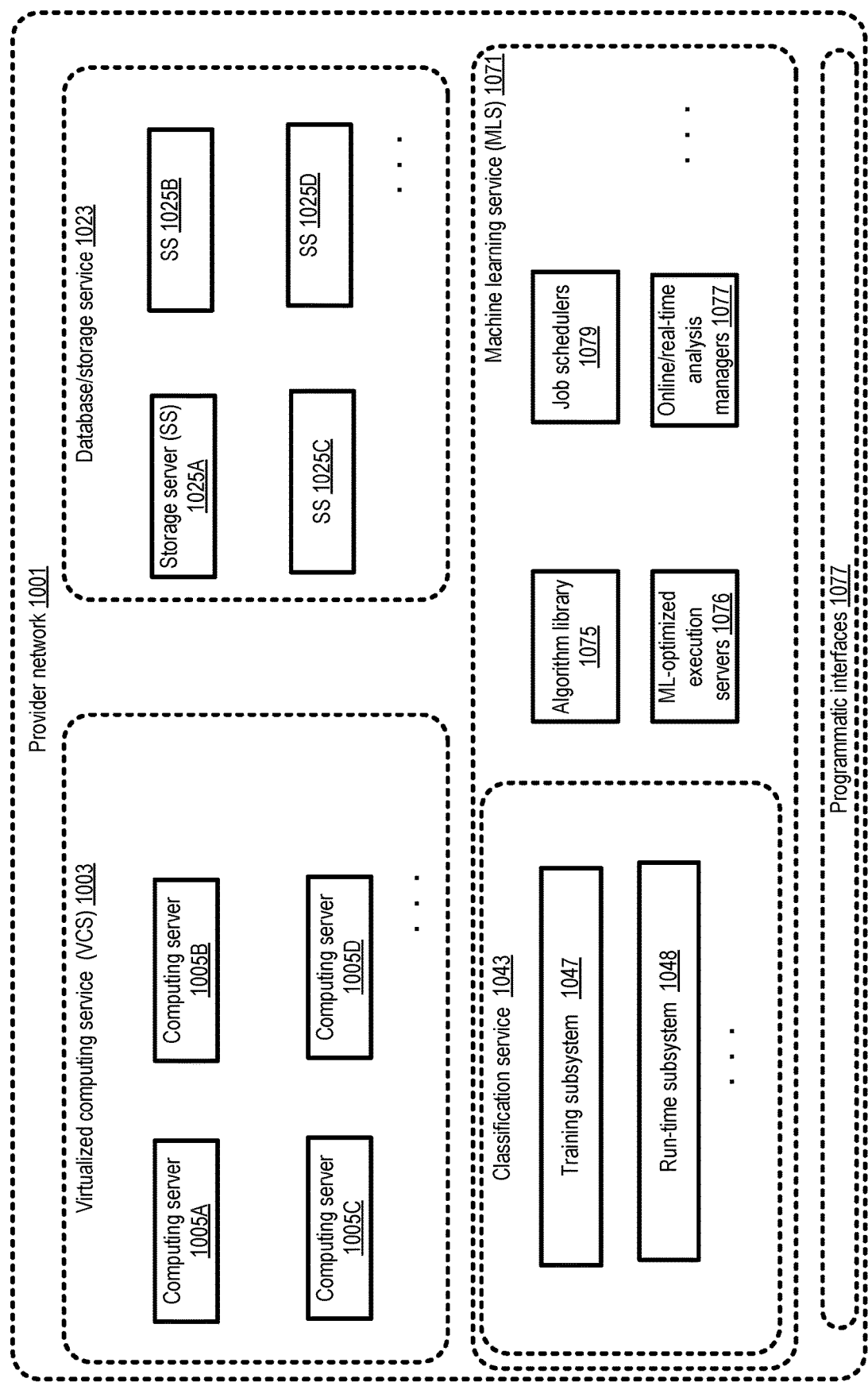
FIG. 10 illustrates an example provider network environment in which a classification service may be implemented, according to at least some embodiments.

In at least some embodiments, the classification service may be implemented as part of a suite of services of a provider network. FIG. 10 illustrates an example provider network environment in which a classification service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtualized computing service (VCS) 1003, a database/storage service 1023, and a machine learning service (MLS) 1071. The machine learning service 1071 in turn may comprise a classification service 1043 (which may have at least some of the features and functionality of the classification service discussed in the context of FIG. 1 and other figures) in at least some embodiments; in other embodiments, the classification service may be implemented as a separate service rather than as a component of the MLS. Components of a given service may utilize components of other services in the depicted embodiment—e.g., for some machine learning tasks, a component of the machine learning service 1071 may utilize virtual machines implemented at computing servers such as 1005A-1005D of the virtualized computing service, the raw data and/or metadata for various machine learning tasks may be stored at storage servers 1025 (e.g., 1025A-1025D) of storage service 1023, and so on. Individual ones of the services shown in FIG. 10 may implement a respective set of programmatic interfaces 1077 which can be used by external and/or internal clients (where the internal clients may comprise components of other services) in the depicted embodiment.

As shown, the classification service 1043 may comprise, among other components, a training subsystem 1047 and a run-time subsystem 1048 in the depicted embodiment. The training subsystem may comprise one or more computing devices that collectively coordinate the implementation of multi-phase active learning-based training iterations as discussed earlier in various embodiments. The run-time subsystem may comprise one or more computing devices which may be used to manage the execution of trained classifiers to provide class predictions after the training iterations are complete.

The classification service 1043 may interact with one or more other services of the provider network in at least two ways in the depicted embodiment. First, resources of other services, such as computing servers 1005 or storage servers 1025 may be used to perform some of the computations involved in classifier training and execution, and/or to store input data or results of classifiers—e.g., one or more of the data sources from which data items of a source data set are retrieved may comprise resources of the database/storage service. The storage service 1023 and/or the VCS 1003 may each provide high levels of availability, data durability, and failure resilience, enabling workloads associated with a large collection of classification customers to be handled in various embodiments. Of course, in various embodiments, algorithms obtained from algorithm library 1075 may be used for various aspects of classifier training and the like. In some embodiments, execution servers 1076 that are optimized specifically for machine learning algorithms may be employed for classifier training and/or execution. Job schedulers 1079 may coordinate resource allocation and scheduling for numerous classifier development efforts concurrently in some embodiments. In one embodiment, online/real-time analysis managers 1077 of the MLS may be used to respond to classification requests for streaming data records as soon as the records are obtained.

In some embodiments, the iterative two-phase active learning based techniques for supporting the training and execution of classifiers may be implemented without acquiring resources of network-accessible services such as those shown in FIG. 10. For example, a standalone tool implemented at one or more computing devices which are not part of a network-accessible service may be used in some embodiments.

Use Cases

The techniques described above, of training classification models for large and heavily skewed data sets using iterative two-phase active learning may be useful in a variety of scenarios. Many machine learning-based classification applications, such as those dealing with fraud detection, medical analysis, regulatory requirements with respect to products being sold at e-retail establishments, and the like, may involve the collection and analysis of extremely large data sets containing millions of records, of which only a tiny fraction actually represent positive examples of target classes of interest. In order to train models which can accurately identify records of the target classes, a sufficiently large set of positive examples for inclusion in the training set of the models is required. The iterative two-phase techniques described can help quickly identify such training data, by eliminating large irrelevant portions of the source data using quick coarse-grain analysis, and then focusing on fine-grained analysis of the remaining records to refine classification models. Significant reductions in overall model training resource usage and time, as well as improved quality classifiers, may be achieved using the described techniques.

Illustrative Computer System

Figure 11:
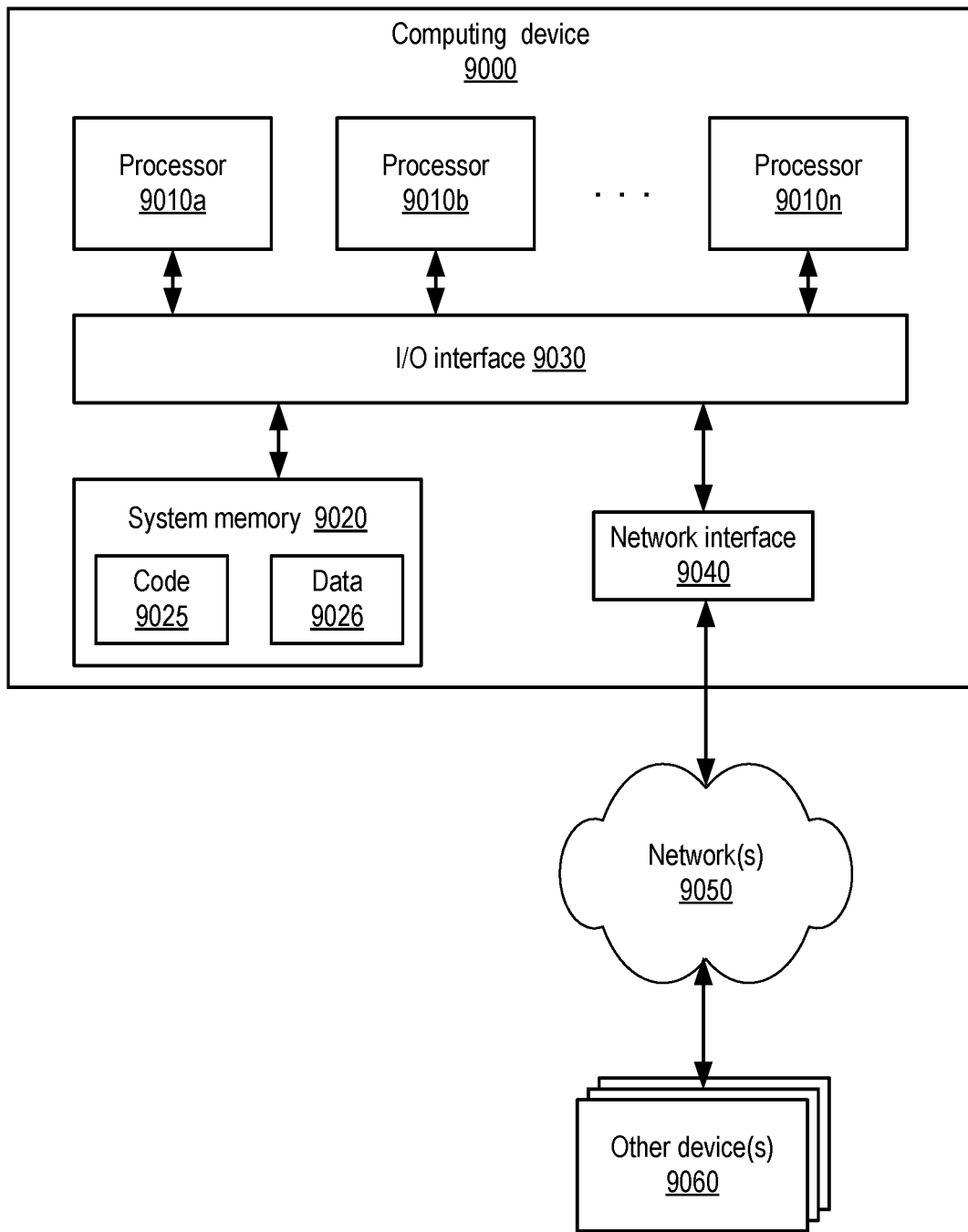
FIG. 11 is a block diagram illustrating an example computing device that may be used in at least some embodiments.

In at least some embodiments, a server that implements one or more of the techniques described herein, including for example components of network-accessible services including machine learning services and classification services at which iterative two-phase active learning based training procedures and the like are implemented may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors implement cause the one or more computing devices to:
obtain an indication, via one or more programmatic interfaces, of a source data set, wherein the source data set comprises a plurality of records to be used to train a classification model for one or more target classes;
divide the source data set into a plurality of buckets, wherein individual ones of the buckets comprise one or more records;
execute a plurality of two-phase learning iterations on selected computing resources to train successive versions of the classification model using the source data set until a training completion criterion is met, wherein individual ones of the two-phase learning iterations include (a) a bucket group selection phase and (b) a class boundary refinement phase, and the training completion criterion limits execution of training by a computing resource consumption limit or execution time limit,
wherein the bucket group selection phase comprises identifying one or more positive-match buckets from among unlabeled buckets in the plurality of buckets, wherein respective ones of the positive-match buckets include at least one record labeled by one or more bucket annotators as a member of a target class of the one or more target classes, wherein the bucket group selection phase eliminates one or more other buckets in the plurality of buckets for annotation to avoid wasting computing resources, wherein at least one bucket is selected as a candidate for annotation based at least in part on output obtained from a first version of a classification model generated in the class boundary refinement phase of an earlier two-phase learning iteration and results of a search query; and
wherein the class boundary refinement phase comprises:
selecting, from among unlabeled records of the one or more positive-match buckets identified in the bucket group selection phase, a set of labeling-candidate records which meet a model enhancement potential criterion;
obtaining, from one or more record annotators, class labels for the set of labeling-candidate records; and
training, using a training data set comprising at least the labeled records obtained from the one or more record annotators, a second version of the classification model;

stop execution of the training when the training completion criterion is met and store a trained version of the classification model produced by the training; and run the trained version of the classification model to classify one or more records which are not in the source data set.

2. The system as recited in claim 1, wherein at least one bucket is selected as a candidate for annotation as a positive-match bucket in the bucket group selection phase based at least in part on a similarity metric with respect to one or more other buckets of the plurality of buckets.

3. The system as recited in claim 1, wherein the one or more computing devices include further instructions that upon execution on or across the one or more processors further cause the one or more computing devices to:

automatically generate the search query.

4. The system as recited in claim 1, wherein the one or more computing devices include further instructions that upon execution on or across the one or more processors further cause the one or more computing devices to:

cause to be presented, via one or more graphical interfaces, respective indications of one or more metrics pertaining to the plurality of two-phase learning iterations, wherein a particular metric of the one or more metrics indicates one or more of: (a) a number of labeled records as a function of completed learning iterations, (b) a number of positive-match buckets as a function of completed learning iterations, or (c) a classification quality metric as a function of completed learning iterations.

5. The system as recited in claim 1, wherein the one or more computing devices include further instructions that upon execution on or across the one or more processors further cause the one or more computing devices to:

provide, via the one or more programmatic interfaces, an indication of at least one annotator to be used for one or more of: (a) the bucket group selection phase of an individual two-phase learning iteration or (b) the class boundary refinement phase of the individual two-phase learning iteration.

6. A method, comprising:

performing, at one or more computing devices:

executing a plurality of multi-phase learning iterations to train successive versions of a classification model on selected computing resources using a source data set of a plurality of records until a training completion criterion is met, wherein individual ones of the multi-phase learning iterations include at least (a) a bucket group selection phase and (b) a class boundary refinement phase, and the training completion criterion limits execution of training by a computing resource consumption limit or execution time limit, wherein the bucket group selection phase comprises identifying one or more positive-match buckets from among unlabeled buckets in a plurality of buckets, wherein individual ones of the buckets comprise a respective subset of the source data set, wherein respective ones of the positive-match buckets include one or more records labeled as members of a target class of one or more target classes, wherein the bucket group selection phase eliminates one or more other buckets in the plurality of buckets for annotation to avoid wasting computing resources, wherein at least one bucket is selected as a candidate for annotation as a positive-match bucket based at least in part on output obtained from a first version of the classification model generated in the class boundary refinement phase of an earlier learning iteration; and wherein the class boundary refinement phase comprises training a second version of the classification model using a training data set including at least a subset of records of the positive-match buckets identified in the bucket group selection phase, wherein at least one record of the subset is identified as a candidate for inclusion in the training data set based at least in part on a model enhancement potential criterion; and stopping execution of the training when the training completion criterion is met and storing a trained version of the classification model produced by the training.

7. The method as recited in claim 6, wherein at least one bucket is selected as a candidate for annotation as a positive-match bucket in the bucket group selection phase based at least in part on a similarity metric computed with respect to one or more other buckets of the plurality of buckets.

8. The method as recited in claim 6, wherein at least one bucket is selected as a candidate for annotation as a positive-match bucket in the bucket group selection phase based at least in part on a result of a search query.

9. The method as recited in claim 6, further comprising performing, at the one or more computing devices:

automatically generating a search query pertaining to the target class, wherein at least one bucket is selected as a candidate for annotation as a positive-match bucket in the bucket group selection phase based at least in part on a result of the automatically generated search query.

10. The method as recited in claim 6, further comprising performing, at the one or more computing devices:

employing a randomized algorithm to select a ranking technique from a plurality of ranking techniques; and employing the selected ranking technique to identify at least one bucket as a candidate for annotation as a positive-match bucket in the bucket group selection phase.

11. The method as recited in claim 6, further comprising performing, at the one or more computing devices:

selecting, from a particular bucket identified as a candidate for annotation as a positive-match bucket in the bucket group selection phase, a collection of unlabeled records, wherein said selecting comprises utilizing the first version of the classification model to estimate a probability that a particular unlabeled record of the particular bucket is a member of the target class; and providing at least one record of the collection of unlabeled records to one or more annotators to determine whether the bucket is to be labeled as a positive-match bucket.

12. The method as recited in claim 6, further comprising performing, at the one or more computing devices:

selecting, from a particular bucket identified as a candidate for annotation as a positive-match bucket in the bucket group selection phase of the particular multi-phase learning iteration, a first number of unlabeled records for which respective labels are to be obtained to determine whether the particular bucket is a positive-match bucket; and selecting, from another bucket identified as a candidate for annotation as a positive-match bucket in the bucket group selection phase of a subsequent multi-phase learning iteration, a different number of unlabeled records for which respective labels are to be obtained to determine whether the other bucket is a positive-match bucket.

13. The method as recited in claim 6, further comprising performing, at the one or more computing devices:
dividing, prior to initiating the plurality of multi-phase learning iterations, the source data set into the plurality of buckets, wherein membership of individual ones of the plurality of buckets comprises one or more records, and wherein membership of at least some buckets of the plurality of buckets is not changed after the plurality of multi-phase learning iterations is initiated.

14. The method as recited in claim 6, further comprising performing, at the one or more computing devices:
obtaining, at a machine learning service of a provider network, a programmatic request to train a classifier, wherein the plurality of multi-phase learning iterations is executed in response to the programmatic request.

15. The method as recited in claim 6, further comprising performing, at the one or more computing devices:
utilizing a plurality of bucketing techniques to divide the source data set into buckets, including a first bucketing technique resulting in the division of the source data set into a first collection of buckets, and a second bucketing technique resulting in the division of the source data set into a second collection of buckets, wherein the plurality of buckets from which one or more positive-match buckets are identified in the bucket group selection phase of the particular multi-phase learning iteration comprises (a) at least one bucket from the first collection and (b) at least one bucket from the second collection.

16. One or more non-transitory computer-accessible storage media storing program instructions that when executed on or across one or more processors cause one or more computer systems to:
perform a plurality of multi-phase learning iterations on selected computing resources to train successive versions of a classification model using a source data set of a plurality of records until a training completion criterion is met, wherein individual ones of the multi-phase learning iterations include at least (a) a bucket group selection phase and (b) a class boundary refinement phase, and the training completion criterion limits execution of training by a computing resource consumption limit or execution time limit,
wherein the bucket group selection phase comprises identifying one or more positive-match buckets from among unlabeled buckets in a plurality of buckets, wherein individual ones of the buckets comprise a respective subset of the source data set, wherein respective ones of the positive-match buckets include one or more records annotated as members of a target class of one or more target classes, wherein the bucket group selection phase eliminates one or more other buckets in the plurality of buckets for annotation to avoid wasting computing resources, wherein at least one bucket is selected as a candidate for annotation as a positive-match bucket based at least in part on output obtained from a first version of the classification model generated in the class boundary refinement phase of an earlier learning iteration; and
wherein the class boundary refinement phase comprises training a second version of the classification model using a training data set including at least a subset of records of the positive-match buckets identified in the bucket group selection phase, wherein at least one record of the subset is identified as a candidate for inclusion in the training data set based at least in part on a model enhancement potential criterion; and
stop execution of the training when the training completion criterion is met and store a trained version of the classification model produced by the training.

17. The one or more non-transitory computer-accessible storage media as recited in claim 16, storing further program instructions that when executed on or across one or more processors further cause one or more computer systems to:
generate data which provides, when presented via one or more programmatic interfaces, respective indications of one or more metrics pertaining to the plurality of multi-phase iterations, wherein a particular metric of the one or more metrics indicates one or more of: (a) a number of labeled records as a function of completed phases, (b) a number of positive-match buckets as a function of completed phases, or (c) a classification quality metric as a function of completed phases.

18. The one or more non-transitory computer-accessible storage media as recited in claim 16, storing further program instructions that when executed on or across one or more processors further cause one or more computer systems to:
implement, to identify the at least one record of the subset as a candidate for inclusion in the training data set, one or more of: (a) a query-by-committee algorithm or (b) an uncertainty sampling algorithm.

19. The one or more non-transitory computer-accessible storage media as recited in claim 16, storing further program instructions that when executed on or across one or more processors further cause one or more computer systems to:
divide, prior to initiating the plurality of multi-phase learning iterations, the source data set into the plurality of buckets based on one or more of: (a) keyword analysis, (b) a locality-sensitive hashing algorithm, (c) a natural language processing (NLP) algorithm, or (d) hierarchical or semantic relationship information.

20. The one or more non-transitory computer-accessible storage media as recited in claim 16, storing further program instructions that when executed on or across one or more processors further cause one or more computer systems to:
store a plurality of versions of the classification model generated in respective iterations of the plurality of multi-phase learning iterations, including the first version and the second version; and
provide, in response to a programmatic request, at least one version of the plurality of versions.

\* \* \* \* \*